(12) United States Patent
Kumata

(10) Patent No.: US 6,715,010 B2
(45) Date of Patent: Mar. 30, 2004

(54) BUS EMULATION APPARATUS

(75) Inventor: Ichiro Kumata, Kanagawa (JP)

(73) Assignee: Sony Corporation, Tokyo (JP)

(*) Notice: Subject to any disclaimer, the term of this patent is extended or adjusted under 35 U.S.C. 154(b) by 468 days.

(21) Appl. No.: 09/781,109

(22) Filed: Feb. 9, 2001

(65) Prior Publication Data

US 2001/0014925 A1 Aug. 16, 2001

(30) Foreign Application Priority Data

Feb. 10, 2000 (JP) ............................. P2000-038262

(51) Int. Cl.$^7$ .............................................. G06F 13/12
(52) U.S. Cl. .......................... 710/71; 710/11; 710/64; 710/105; 709/100
(58) Field of Search ......................... 710/71, 64, 65, 710/11, 38, 106, 105; 370/282, 241, 249; 709/100, 102

(56) References Cited

U.S. PATENT DOCUMENTS

| | | | |
|---|---|---|---|
| 4,187,394 A | * | 2/1980 | Sievers ....................... 370/282 |
| 4,247,934 A | | 1/1981 | Parras |
| 4,627,076 A | | 12/1986 | Staal et al. |
| 5,557,755 A | | 9/1996 | Krein et al. |
| 5,564,061 A | * | 10/1996 | Davies et al. ................. 710/64 |
| 5,581,709 A | | 12/1996 | Ito et al. |
| 5,635,873 A | | 6/1997 | Thrower et al. |
| 5,687,388 A | | 11/1997 | Wooten et al. |
| 6,298,370 B1 | * | 10/2001 | Tang et al. .................. 709/102 |

FOREIGN PATENT DOCUMENTS

| | | |
|---|---|---|
| EP | 0 506 136 | 9/1992 |
| EP | 0 588 030 | 3/1994 |
| EP | 0 615 361 | 9/1994 |
| EP | 0 808 044 | 11/1997 |
| EP | 0 909 062 | 4/1999 |
| EP | 0 939 511 | 9/1999 |
| EP | 0 997 824 | 5/2000 |
| GB | 2 158 977 | 11/1985 |

OTHER PUBLICATIONS

Patent Abstracts of Japan vol. 008, No. 036 (E–227), Feb. 16, 1984 & JP 58 195347 A (Fujitsu KK), Nov. 14, 1983.

* cited by examiner

*Primary Examiner*—Khanh Dang
(74) *Attorney, Agent, or Firm*—Frommer Lawrence & Haug LLP; William S. Frommer; Dennis M. Smid

(57) ABSTRACT

A bus emulation apparatus includes serial transfer paths, serial interface circuits having a parallel to serial conversion circuit for converting parallel data from a peripheral circuit to serial data and supplying to a serial transfer path and a serial to parallel conversion circuit for converting serial data from a hub circuit to parallel data and supplying to a peripheral circuit, a hub circuit for supplying serial data from a serial interface circuit to a serial interface circuit connected to a peripheral circuit as a transfer destination of said parallel data among the serial interface circuits, and a network for connecting them, and installed on an LSI or a print circuit board to replaced a parallel bus.

24 Claims, 17 Drawing Sheets

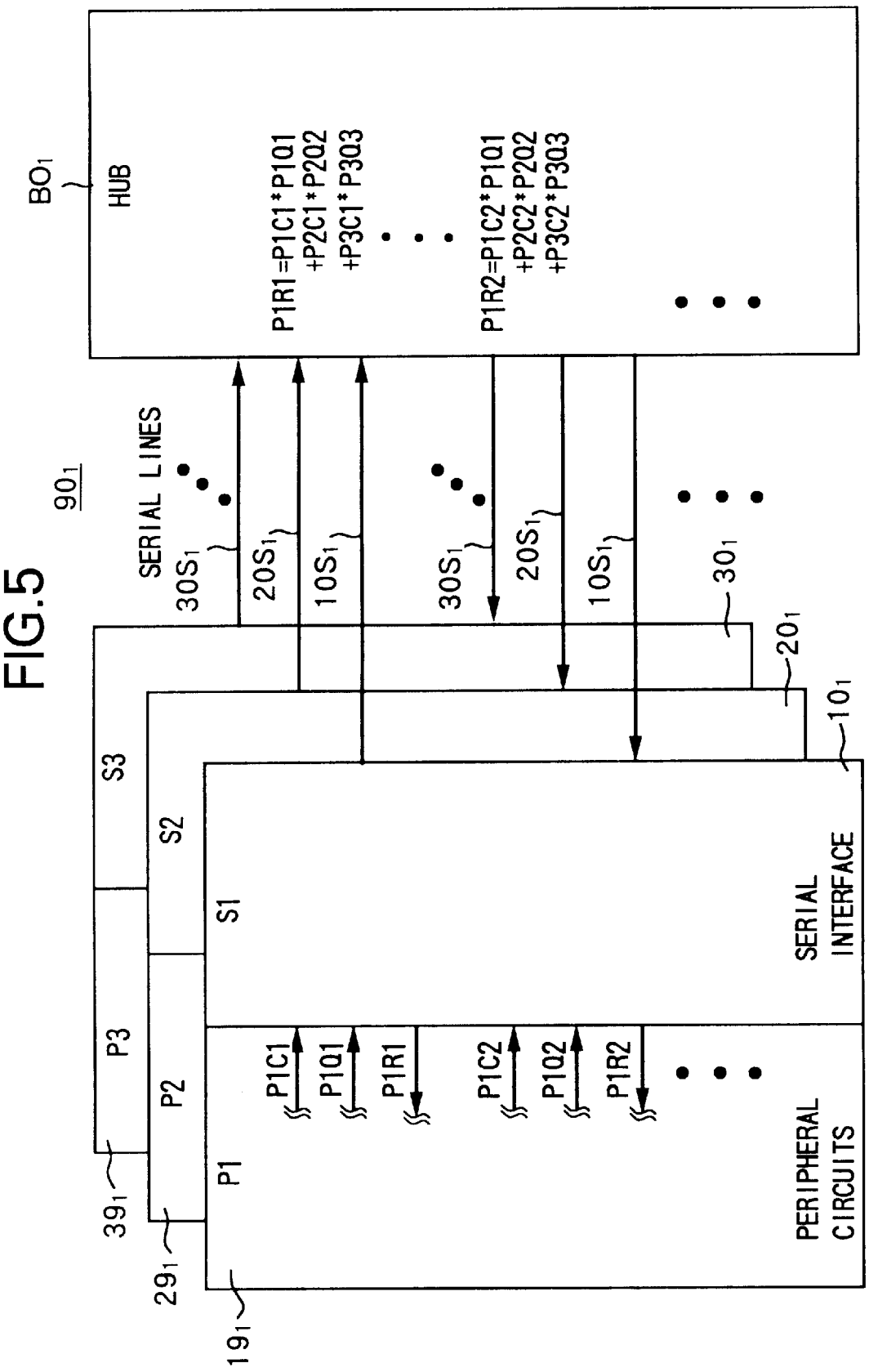

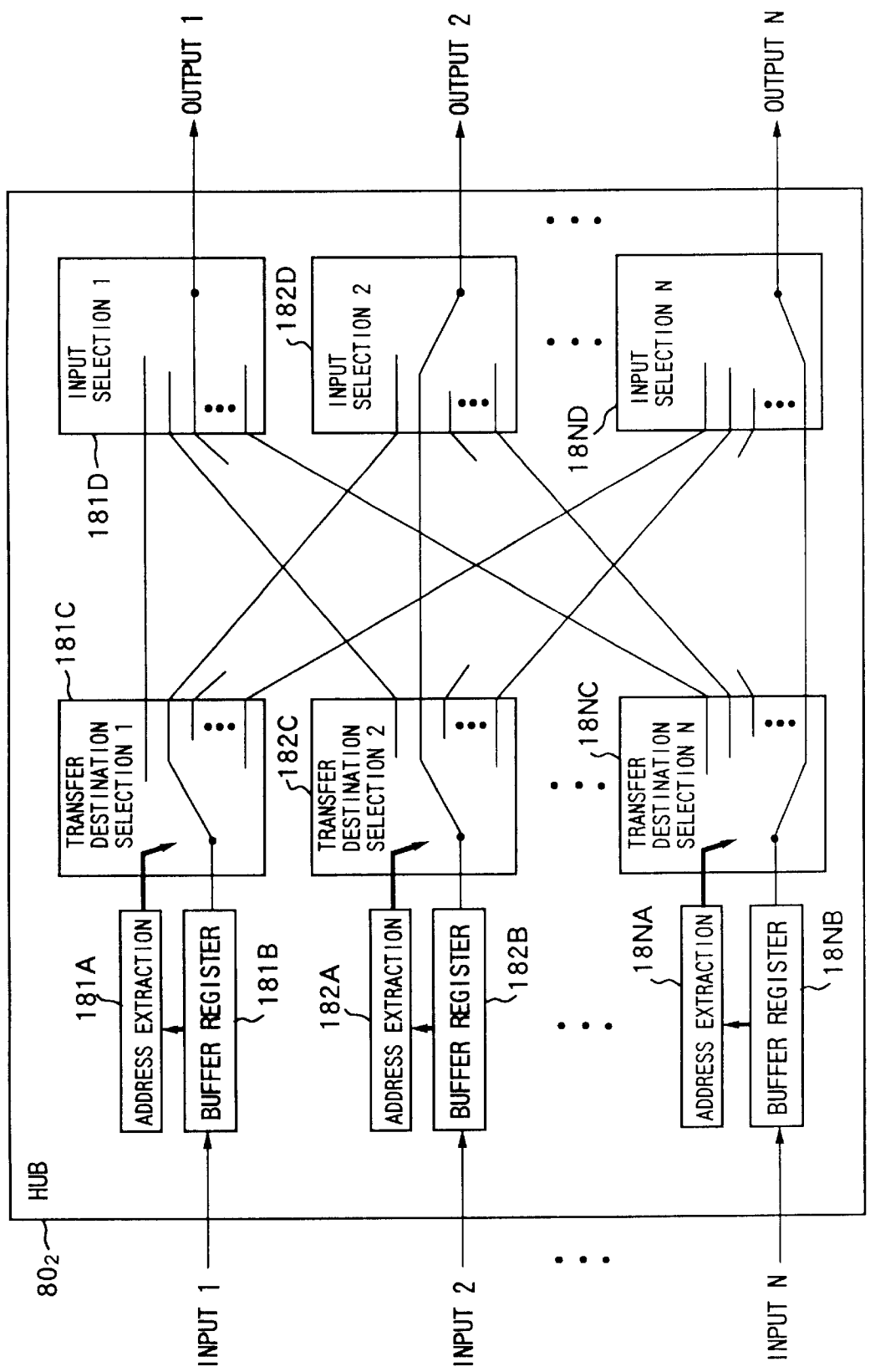

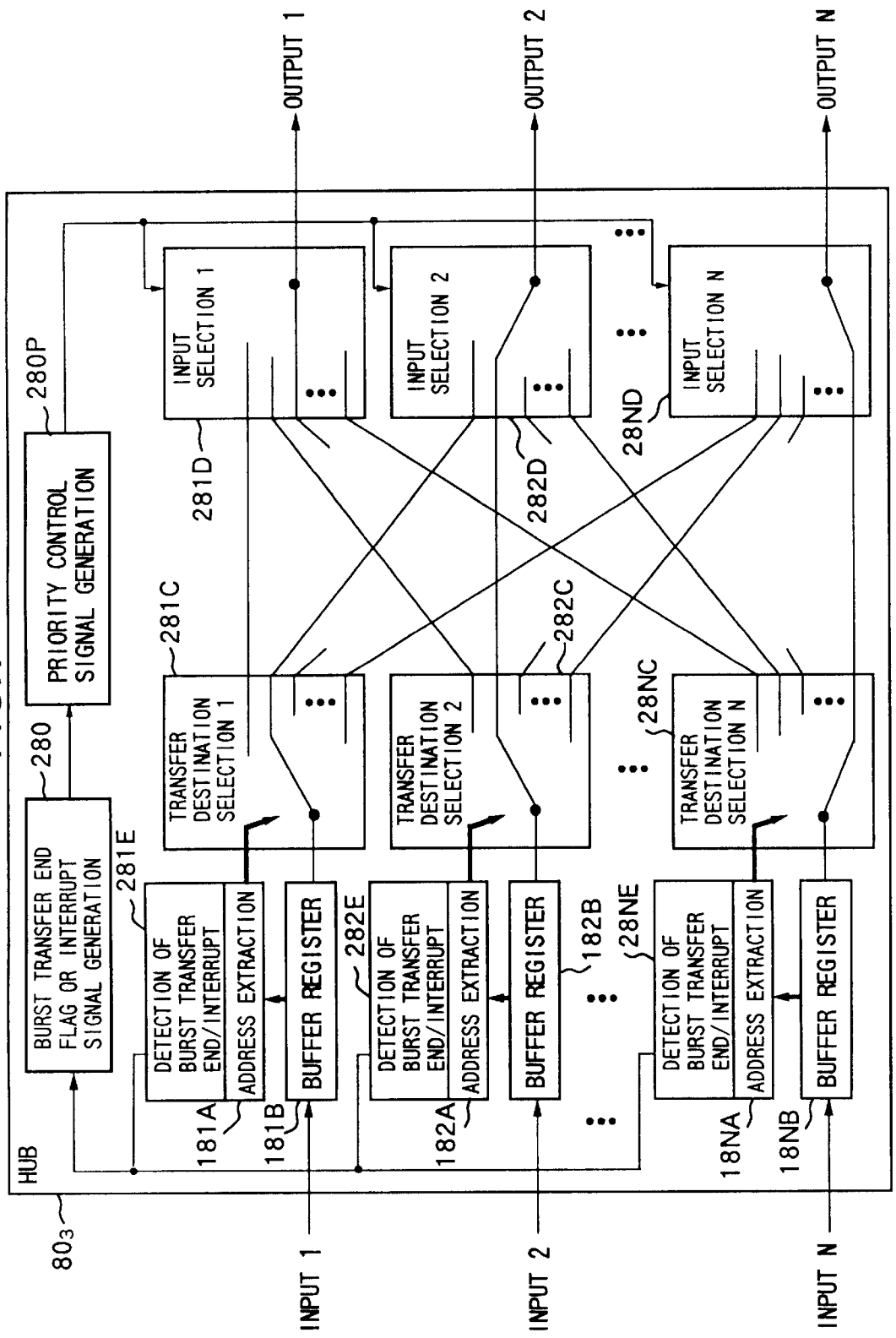

BUS EMULATION APPARATUS

BACKGROUND OF THE INVENTION

1. Field of the Invention

The present invention relates to a bus emulation apparatus for transferring data between peripheral circuits via a hub circuit.

2. Description of the Related Art

A hub or a network having a hub is described in the Japanese Unexamined Patent Publication Nos. 11-284636, No.11-168493, 11-88397, 62-220047 and 7-297853.

For example, Japanese Unexamined Patent Publication No. 11-284636 discloses a hub apparatus and a USB (Universal Serial Bus) communication system. This publication discloses an addition of a function of directly connecting data paths between devices to the hub apparatus.

Japanese Unexamined Patent Publication No. 11-88397 discloses a switching hub. In this publication, a serial/parallel converter is provided among a plurality of high speed network interface portions and a plurality of low speed network switching portions, the data transfer is performed in a serial data within the high speed network interface portion and in a parallel data within the low speed switching portion, and the data transfer rate can be switched.

The Japanese Unexamined Patent Publication No. 7-297853 discloses the polling of a remote station in an extensible round-robin local area network.

In a cabinet of a personal computer and a digital home-use electricity apparatus of the related art, a multi-drop connection mode used a parallel wired bus is generally used.

In such the connection mode of the related art, since the flattening and terminating of an impedance of the wiring path is difficult, it is difficult to raise a data transfer rate per one signal line. Therefore, the number of the wires increases and it suffers from the disadvantages of an increase of a wiring area, an increase of an electro magnetic interference (EMI), a limit of a wiring length, etc.

Furthermore, in a bus wiring and bus architecture of a large-scale integrated circuit (LSI) or a print circuit board of the related art, when transferring a digital signal such as an audio, a video, etc. between peripheral circuits, it is difficult to transfer other signal between other peripheral circuits at a same time.

Therefore, a bus emulation apparatus for satisfying functions of a parallel bus wiring, bus driver, bus receiver, etc. of the related art and overcoming the disadvantages in the existing bus as explained above has been demanded.

Note that serial network standards, such as the IEEE (Institute of Electrical and Electronics Engineers) 1394, Universal Serial Bus (USB) and Eithernet, are basically a Time-Division Multiple Access (TDMA) system, so it is difficult to perform a simultaneous multiple transfers in the same way as in a normal bus.

A wide area network using telephones and an Asynchronous Transfer Mode switching system (ATM) have a hub and spoke type topology, but an objected physical area, a device scale, a timing request, etc. are largely different and is essentially different on a concept to a bus exchange.

SUMMARY OF THE INVENTION

A first object of the present invention is to provide a bus emulation apparatus installed on an LSI or a print circuit board and replaceable by a parallel bus.

A second object of the present invention is to provide a bus emulation apparatus capable of transferring data between other peripheral circuits while transferring data between peripheral circuits.

According to the present invention, there is provided a bus emulation apparatus comprising: a hub circuit; a plurality of serial interface circuits; and serial transfer paths for connecting the plurality of serial interface circuits and the hub circuit and being installed on a large scale integrated circuit or a print circuit board, the serial interface circuit comprising: a parallel to serial conversion circuit for converting parallel data from a peripheral circuit connected to the serial interface circuit to a serial data and supplying to the serial transfer path; and a serial to parallel conversion circuit for converting serial data supplied from the hub circuit via the serial transfer path to a parallel data and supplying to the peripheral circuit; and the hub circuit supplying the serial data supplied from the serial interface circuit via the serial transfer path to a serial interface circuit connected to a peripheral circuit as a transfer destination of the parallel data among the plurality of serial interface circuits via the serial transfer path.

Preferably, the hub circuit divides the plurality of serial interface circuit into a plurality of groups for performing data transfers in advance and relays the serial data between the serial interface circuits so that parallel data is transferred in the respective plurality of groups.

Preferably, the serial data supplied from the serial interface circuit to the hub circuit via the serial transfer path comprises an address information indicating a transfer destination; and the hub circuit supplies the serial data to the serial interface circuit connected to a peripheral circuit as the transfer destination based on the address information.

Preferably, the hub circuit comprises a buffer for storing serial data supplied from the serial interface circuit via the serial transfer path; an extraction circuit for extracting address information included in the serial data; a control circuit for determining transfer priority when a plurality of transfer requests exist to a same transfer destination; and a selection circuit for selecting a transfer path of the serial data based on the address information extracted by the extraction circuit and the priority determined by the control circuit.

Alternately, it may be configured that the hub circuit further comprises a detection circuit for detecting transfer end of the serial data form the serial interface circuit and/or an interrupt by the serial interface circuit; and the control circuit determines the priority based on a detection result of the detection circuit.

Alternately, it may be configured that the hub circuit further comprises a clock signal generation circuit for generating a plurality of clock signals having different clock frequencies; and the buffer receives a clock signal from the clock signal generation circuit in accordance with a transfer rate of a peripheral circuit as a transfer source or a transfer destination and inputs/outputs the serial data at a transfer rate in accordance with the supplied clock signal.

Preferably, the hub circuit comprises DMA controllers for controlling transfers of the serial data between the serial interface circuits corresponding to each of the plurality of serial interface circuits.

Preferably, the hub circuit supplies a clock signal to the serial interface circuit via the serial transfer path; and the serial interface circuit supplies the clock signal supplied from the hub circuit to a peripheral circuit operating based on the clock signal and connected to the serial interface circuit.

Alternately, it may be configured that the serial interface circuit comprises a counter for counting the number of data in the buffer in the hub circuit; stops the transmitting the serial data to the hub circuit when a counter value of the counter indicates that the buffer has no vacancy, and transmits the serial data to the hub circuit when the count value of the counter indicates that the buffer has a vacancy.

More preferably, the serial interface circuit, when the parallel data of this time supplied from the peripheral circuit is exactly identical or substantially identical with the preceding parallel data, generates a flag indicating the exactly identity or substantially identity and supplies the generated flag to the hub circuit; and the hub circuit comprises a cache memory for storing preceding serial data corresponding to the preceding parallel data and generates serial data of this time corresponding to the parallel data of this time based on the serial data stored in the cache memory and the flag.

Alternately, it may be configured that the serial interface circuit detects that a difference between the preceding parallel data and the parallel data of this time is ±1 and generates the flag indicating the difference; and the hub circuit operates calculation of ±1 on the preceding serial data stored in the cache memory based on the flag to generate the serial data of this time.

More preferably, the hub circuit, when the serial data of this time supplied from the serial interface circuit via a serial transfer path is exactly identical or substantially identical with the preceding serial data, generates a flag indicating the exactly identity or substantially identity; and the serial interface circuit connected to a peripheral circuit as a transfer destination comprises a cache memory for storing the preceding parallel data corresponding to the preceding serial data from the hub circuit and generates parallel data of this time based on the parallel data stored in the cache memory and the flag from the hub circuit.

Alternately, it may be configured that the hub circuit detects that a difference between the preceding serial data and the serial data of this time is ±1 and generates the flag indicating the difference; and the serial interface circuit connected to a peripheral circuit as the transfer destination operates a calculation of ±1 based on the flag on the preceding parallel data stored in the cache memory and generates the parallel data of this time.

More preferably, the serial interface circuit connected to a peripheral circuit as a transfer destination, when the parallel data of this time supplied from the peripheral circuit is exactly identical or substantially identical with the preceding parallel data, generates a flag indicating the exactly identity or substantially identity and supplies the generated flag to the hub circuit; and the serial interface circuit connected to a peripheral circuit of the transfer destination comprises a cache memory for storing the preceding parallel data corresponding to the preceding serial data from the hub circuit and generates the parallel data of this time based on the parallel data stored in the cache memory and the flag from the hub circuit.

Alternately, it may be configured that the serial interface circuit connected to the peripheral circuit of the transfer destination detects that difference between the preceding parallel data and the parallel data of this time is ±1 and generates the flag indicating the difference; and the serial interface circuit connected to the peripheral circuit as the transfer destination operates a calculation of ±1 on the preceding parallel data stored in the cache memory based on the flag to generate the parallel data of this time.

More preferably, a data length of address information on a most frequently transferred peripheral circuit is shorter than a data length of an address information on a least frequently transferred peripheral circuit.

Preferably, the hub circuit supplies serial data at a plurality of transfer rates to the serial interface circuits and conducts tests of transfer rates; and the serial interface circuit converts the parallel data generated in the serial to parallel conversion circuit to serial data in the parallel to serial conversion circuit and sends back to the hub circuit during the transfer rates tests.

Preferably, the hub circuit conducts connection tests between the plurality of serial interface circuits or self-tests during a spare time of data transfers.

Preferably, the hub circuit has a function of notifying working states of the buffer to a higher controller or a higher system for performing transfer control and/or error recovery.

Preferably, the hub circuit supplies serial data from a specific serial interface circuit among the plurality of serial interface circuits to a serial interface circuit connected to a different peripheral circuit from a peripheral circuit as a transfer destination indicated by address information in the serial data.

Preferably, the parallel to serial conversion circuit converts the parallel data from the peripheral circuit to encoded serial data and supplies to the hub circuit; and the serial to parallel conversion circuit converts the encoded serial data from the hub circuit to decoded parallel data.

More preferably, the parallel to serial conversion circuit comprises a first linear feedback shift register for encoding parallel data from the peripheral circuit; the serial to parallel conversion circuit comprises a second linear feedback shift register for decoding encoded serial data from the hub circuit; and the first and second linear feedback shift registers mutually operate an inverse calculation.

Alternately, it may be configured that an operation frequency of the first linear feedback shift register during an encoding operation is higher than an operation frequency during a transmission operation for shifting and transmitting the encoded serial data.

Alternately, it may be configured that an operation frequency of the second linear feedback shift register during a decoding operation is higher than an operation frequency during a receiving operation for shifting and receiving the encoded serial data from the hub circuit.

Alternately, it may be configured that the serial interface circuit further comprises a register for storing identification information or encoding key information and supplies backup power to the register during a power source failure.

Preferably, a signal line of the serial transfer path is terminated by a terminal resistance, and the terminal resistance comprises a plurality of transistors connected in parallel, the plurality of transistors are selectively set to be an on state and the terminal resistence value is set.

Preferably, the hub circuit and the serial interface circuit further comprises a driver for transmitting serial data to the serial transfer path; and a receiver for receiving serial data from the serial transfer path; and the wire for shielding a signal line of the serial transfer path and a supply line of a drive voltage of the driver and receiver are connected.

More preferably, the receiver comprises a differential type amplification circuit for outputting serial data; one input terminal of the differential amplify circuit is connected to a signal line of the serial transfer path; and other input terminal of the differential type amplification circuit is supplied as an input threshold a voltage obtained by dividing the drive voltage.

Preferably, the signal line of the serial transfer path is grounded via capacitors and terminal resistance element connected in series.

Alternately, it may be configured that the wire for shielding the signal line of the serial transfer path and a ground terminal of the terminal resistance element are connected.

The above bus emulation apparatus according to the present invention comprises a hub circuit, a plurality of serial interface circuits and serial transfer paths for connecting between the plurality of serial interface circuits and the hub circuit, respectively.

The bus emulation apparatus is installed on an LSI or a print circuit board.

The serial interface circuit comprises a parallel to serial conversion circuit for converting parallel data from a peripheral circuit to serial data and supplies to a serial transfer path and a serial to parallel conversion circuit for converting serial data from a hub circuit to parallel data and supplies to the peripheral circuit.

The hub circuit supplies serial data supplied from the serial interface circuit to a serial interface circuit connected to a peripheral circuit as a transfer destination of the parallel data.

As explained above, the bus emulation apparatus of the present invention can have the same functions as those in a bus of the related art.

BRIEF DESCRIPTION OF THE DRAWINGS

These and other objects and features of the present invention will become clearer from the following description of the preferred embodiments given with reference to the accompanying drawings, in which:

FIG. 5 is a view of the configuration of an embodiment of the bus emulation apparatus in FIG. 1;

FIG. 6 is a view of the configuration of an example of a hub circuit in the bus emulation apparatus in FIG. 1;

FIG. 7 is a view of the configuration of an example of a hub circuit in the bus emulation apparatus in FIG. 1.

DESCRIPTION OF THE PREFERRED EMBODIMENTS

Below, preferred embodiments of the present invention will be described with reference to the accompanying drawings.

Figure 1:
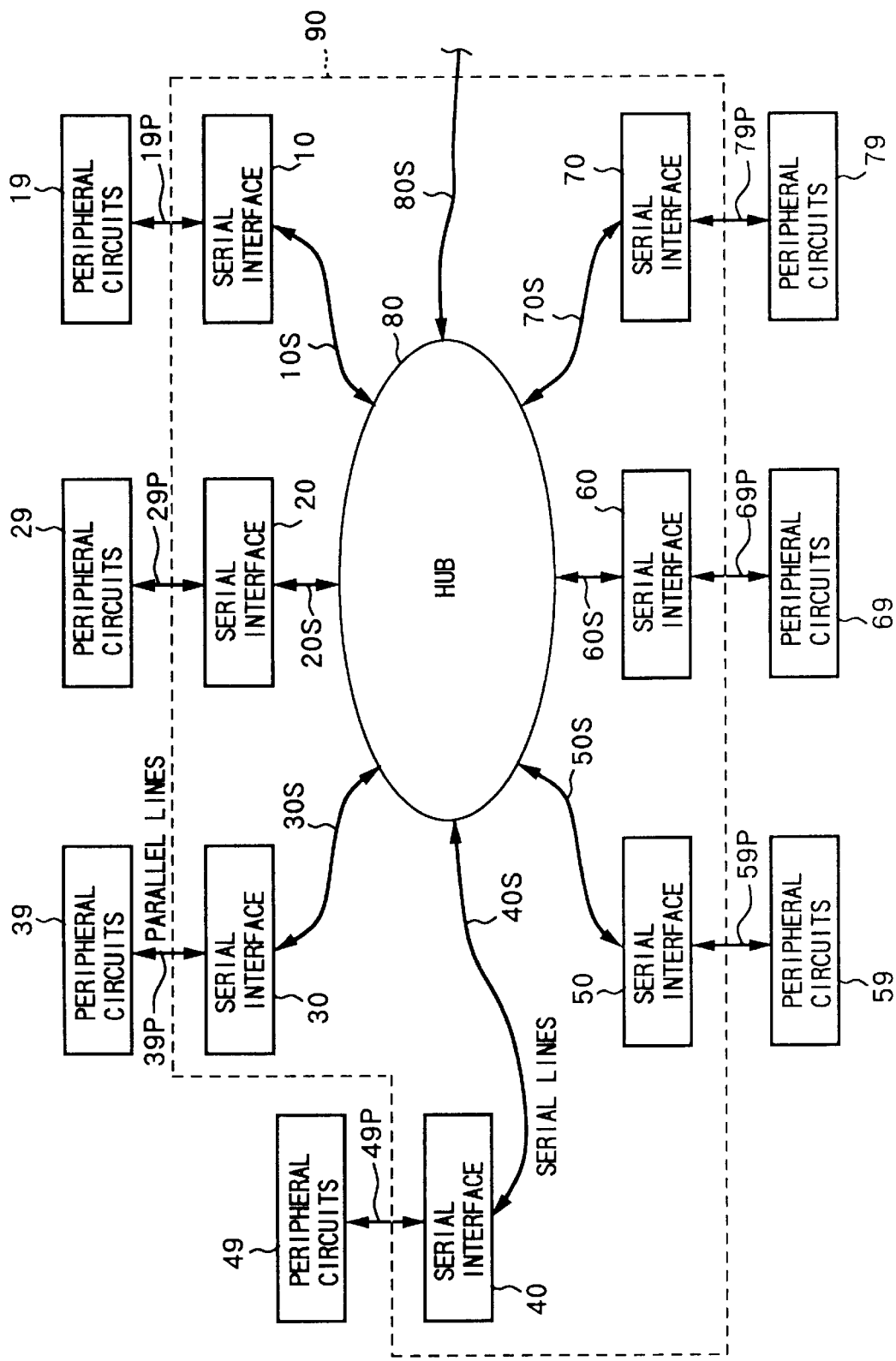
FIG. 1 is a view of the configuration of a bus emulation apparatus according to the present invention.

FIG. 1 is a view of the configuration of a bus emulation apparatus according to the present invention.

The bus emulation apparatus 90 comprises a hub circuit 80, a plurality of serial interface circuits 10 to 70, and serial transfer paths 10S to 70S respectively connecting the plurality of serial interface circuits 10 to 70 and the hub circuit 80.

The bus emulation apparatus 90 is installed on a large-scale integrated circuit (LSI) and/or a print circuit board.

The serial interface circuits 10 to 70 are connected to the peripheral circuits 19 to 79 via parallel transfer paths 19P to 79P. Also, the hub circuit 80 is connected to a serial transfer path 80S from a not shown external apparatus.

At least one of the peripheral circuits 19 to 79 comprise a signal processing circuit for processing an audio and/or video digital signal. The peripheral circuits 19 to 79 are comprised of, for example, a central processing unit (CPU), a hard disk device (HDD), a memory, a digital signal processor (DSP), a front-end processor (FEP), etc.

Figure 2:
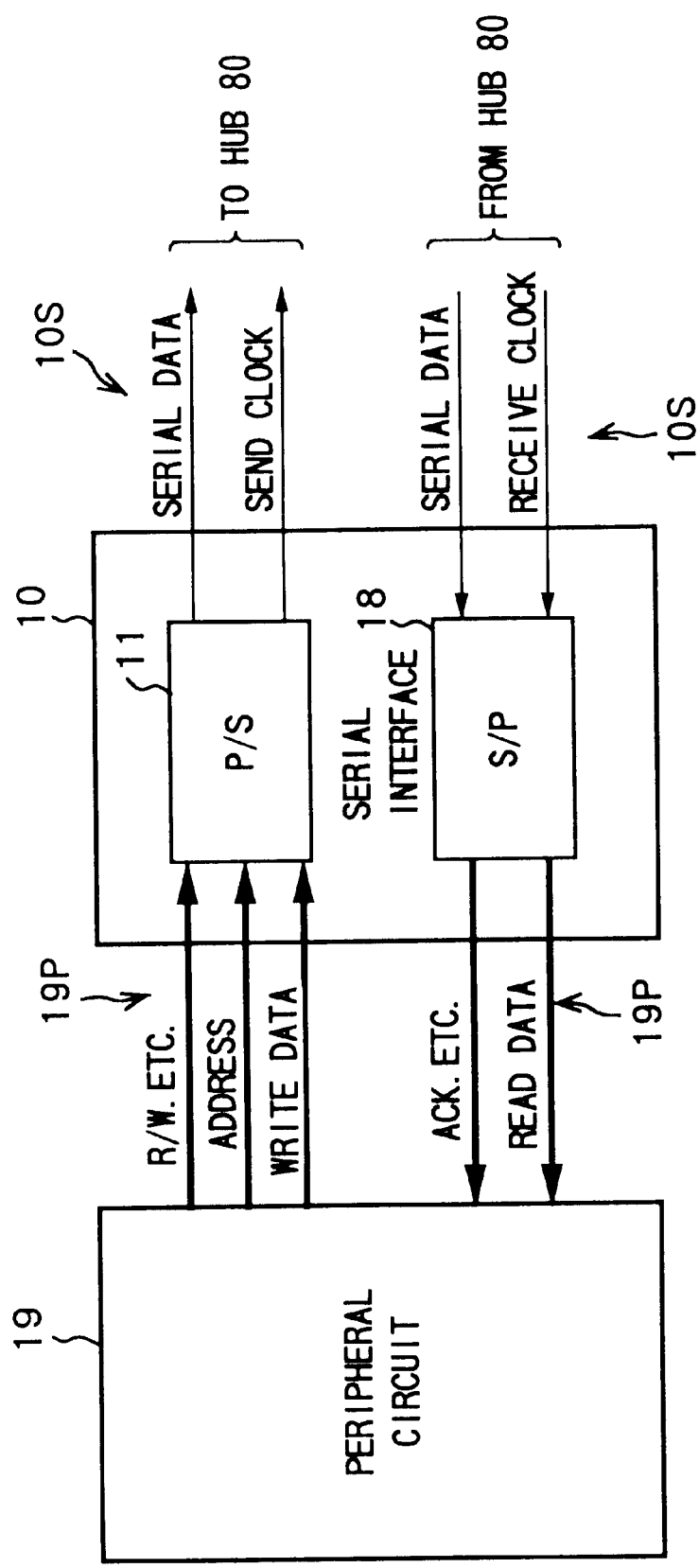
FIG. 2 is a view of the configuration of a connection relationship between a peripheral circuit, serial interface circuit and a hub circuit in the bus emulation apparatus in FIG. 1.

FIG. 2 is a view of the configuration of a connection relationship among a peripheral circuit, a serial interface circuit and a hub circuit in the bus emulation apparatus 90 in FIG. 1.

Note that respective connection relationships among the peripheral circuits 19 to 79, serial interface circuits 10 to 70 and the hub circuit 80 have the same configuration. Here, a connection relationship between the peripheral circuit 19, serial interface circuit 10 and the hub circuit 80 will be explained as an example.

The serial interface circuit 10 comprises a parallel to serial conversion circuit (P/S conversion circuit) 11 for converting parallel data to serial data and a serial to parallel conversion circuit (S/P conversion circuit) 18 for converting serial data to parallel data.

Respective signal lines of serial data and clock signals are connected by one to one to connection ports (not shown) of the hub 80. Note that when performing a data transfer of a long transfer distance at a high rate, it is preferable to prevent a distortion of a signal waveform by performing termination processing.

The peripheral circuit 19 supplies a signal indicating address information, a signal indicating parallel data, a control signal of reading/writing, etc. to the P/S conversion circuit 11.

The P/S conversion circuit 11 converts parallel data to serial data based on a signal from the peripheral circuit 19 and transfers the serial data together with a transmission clock signal to the hub circuit 80.

The S/P conversion circuit 18 is supplied serial data and a receiving clock signal from the hub circuit 80. The S/P conversion circuit 18 converts serial data to parallel data and transfers the parallel data together with a response signal ACK, etc. to the peripheral circuit 19.

As explained above, the P/S conversion circuit 11 receives data in parallel from the peripheral circuit 19, converts the received data to serial data on a time axis and transfers to the hub circuit 80 via the serial transfer path 10S.

In the hub circuit 80, data is transferred to an appropriate S/P conversion circuit via a serial transfer path based on information indicating the P/S conversion circuit 11 (or the peripheral circuit 19) of a transmission source of the serial data, an address of a data transfer destination, control information of R(read)/W(write), etc.

The S/P conversion circuit converts serial data sent from the hub circuit 80 via the serial transfer path 10S to parallel data and transmits the parallel data to a peripheral circuit as a final destination of the data transfer.

For example, the S/P conversion circuit 18 converts the serial data sent from the hub circuit 80 via the serial transfer path 10S to parallel data and transfer the parallel data to the peripheral circuit 19 as a destination of the data transfer.

When writing data from one peripheral circuit to other peripheral circuit, a signal indicating write (W) and a signal indicating address information (Address) of a portion to be written (transfer destination) and write data are sent via the hub circuit 80.

On the other hand, when one peripheral circuit reads data from other peripheral circuit, a signal indicating read (R) and a signal indicating address information (Address) of a reading source (an object to be read) are sent to the peripheral circuit as the object to be read via the hub circuit 80. Then, data read from the other peripheral circuit is sent to the peripheral circuit which requested the reading via the P/S conversion circuit, hub circuit 80 and S/P conversion circuit.

As explained above, the bus emulation apparatus 90 connects among the peripheral circuits 19 to 79 having a parallel interface and relays data transferring.

Figure 3:
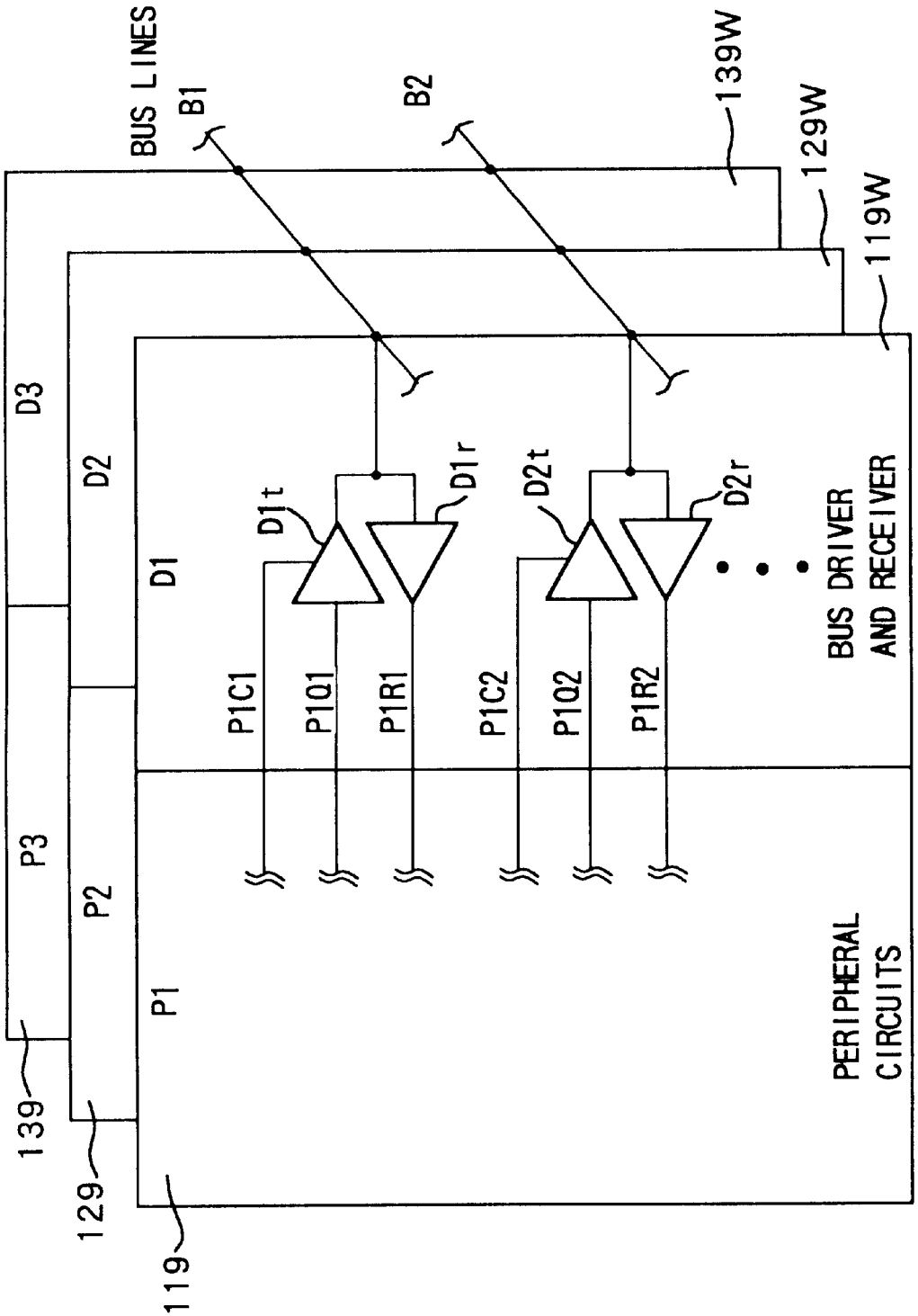
FIG. 3 is a view of a connection relationship of peripheral circuits and bidirectional bus drivers and a view for explaining the configuration being in contrast with a bus emulation apparatus of the present invention.

FIG. 3 is a view of a connection relationship of a peripheral circuit and a bidirectional bus driver and for explaining the configuration showing a contrast with the bus emulation apparatus of the present invention.

In FIG. 3, a peripheral circuit 119 is connected to parallel bus signal lines B1, B2, . . . via a bidirectional bus driver 119W.

In the same way, peripheral circuits 129 and 139 are connected to signal lines B1, B2, . . . via bidirectional bus drivers 129W and 139W.

Note that respective connection relationships of the peripheral circuits 119 to 139, bidirectional bus drivers 119W ro 139W and signal lines B1, B2, . . . have the same configuration. Here, a connection relationship of the peripheral circuit 119, bidirectional bus driver 119W and signal lines B1, B2, . . . will be explained as an example.

The bidirectional bus driver 119W comprises bus drivers D1t, D2t, . . . , and bus receivers D1r, D2r, . . .

Output terminals of the bus drivers D1t, D2t, . . . are connected to input terminals of corresponding bus receivers D1r, D2r and corresponding signal lines B1, B2, . . .

Output signals of the bus drivers D1t, D2t, . . . are output to the corresponding signal lines B1, B2, . . .

The bus receivers D1r, D2r, . . . receive as inputs signals from the corresponding signal lines B1, B2, . . .

The bus driver D1t is comprised of a tristate driver, whose input terminal is supplied a data signal P1Q1 from the peripheral circuit 119 and the control terminal is supplied a control signal P1C1 from the peripheral circuit 119.

The bus receiver D1r is comprised of a driver and supplies its output signal P1R1 to the peripheral circuit 119.

The bus driver D2t is comprised of a tristate driver, its input terminal is supplied a data signal P1Q2 from the peripheral circuit 119 and its control terminal is supplied a control signal P1C2 from the peripheral circuit 119.

The bus receiver D2r is comprised of a driver and supplies its output signal P1R2 to the peripheral circuit 119.

In FIG. 3, the respective tristate drivers in one of any bidirectional bus drivers 119W to 139W, . . . is set to be an on state and data is transferred to any one of the peripheral circuits 119 to 139, . . . via other bidirectional bus driver.

Figure 4A:
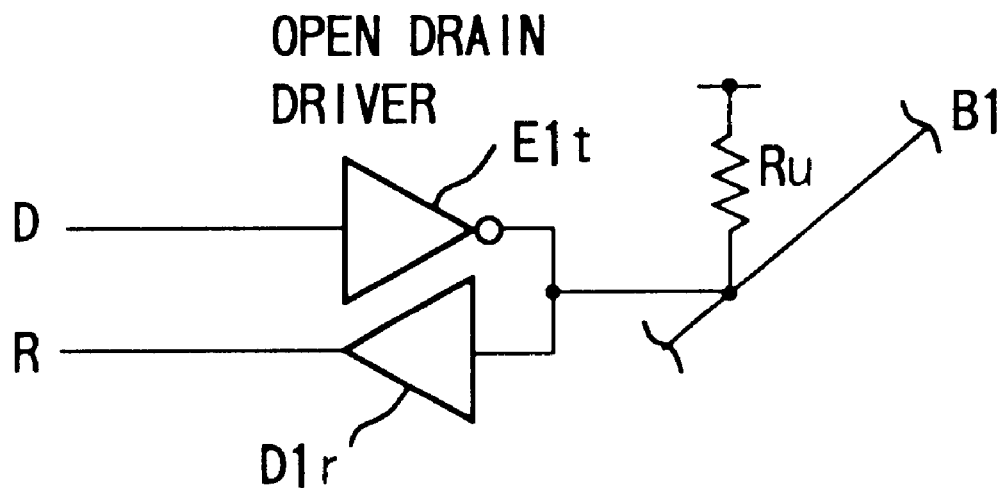
FIGS. 4A and 4B are circuit diagrams of an example of a bidirectional bus driver.
Figure 4B:
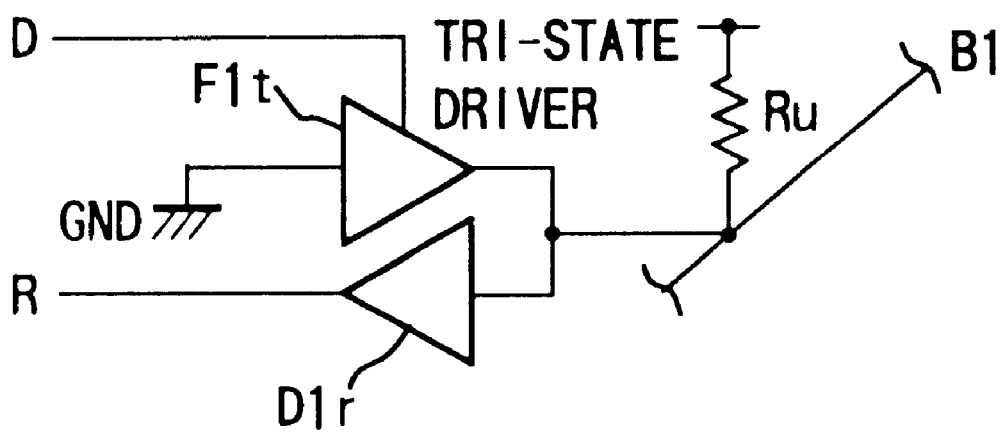

FIG. 4 are circuit diagrams of an example of a bidirectional bus driver. The peripheral circuits can be connected by using bidirectional bus drivers shown in FIG. 4A or FIG. 4B instead of the bidirectional bus driver in FIG. 3. Note that the bidirectional bus drivers in FIGS. 4A and 4B are equivalent circuits.

The bidirectional bus driver in FIG. 4A comprises a bus driver E1t, bus receiver D1r and a pull-up resistence Ru.

The bus driver E1t is an open drain type bus driver whose output terminal is connected to an input terminal of the bus receiver D1r, pull-up resistence Ru and signal line B1.

By connecting the bidirectional bus driver in FIG. 4A in parallel with the signal line B1, the signal line B1 can be held at a high level to make the signal R at a high level when the signal D is at a low level, while the signal line B1 can be held at a low level to make the signal R at a low level when the signal D is at a high level.

The bidirectional bus driver in FIG. 4B comprises a bus driver F1t, a bus receiver D1r and a pull-up resistance Ru.

The bus driver F1t is a tristate bus driver and its output terminal is connected to the input terminal of the bus receiver D1r, the pull-up resistance Ru and the signal line B1.

By connecting the bidirectional bus driver in FIG. 4B in parallel with the signal line B1, the signal line B1 can be held at a high level to make the signal R at a high level when the signal D is at a low level, while the signal line B1 can be held at a low level to make the signal R at a low level when the signal D is at a high level.

Note that in a wired-OR connection using a tristate driver or an open drain type driver, a plurality of drivers are connected to an identical signal line. Therefore, effective termination and flattening of the characteristic impedance of a signal path are difficult and the signal waveform may be distorted. Accordingly, it is difficult to attain a higher data transfer rate per one signal line comparing with the case of one-to-one connection and to transfer a long distance while keeping the transfer rate.

Furthermore, since the tristate driver and open drain driver not transmitting a signal have a large capacity load, there is a side that the transfer rate declines as the number of connection increases.

FIG. 5 is a view of the configuration of an embodiment of the bus emulation apparatus 90 in FIG. 1. In FIG. 5, transmission/reception of a clock signal between the serial interface circuit and hub circuit is omitted.

Below, a method of emulating an existing tristate driver (tristate driver), open drain type driver and bus wiring functions as shown in FIGS. 3 and 4 in the circuit configuration of the present invention as it is will be described. Note that signals P1C1, P1Q1, P1R1, P1C2, P1Q2 and P1R2 in FIG. 5 are the same as the control signal or transmitting/receiving signals connected to the bidirectional bus driver in FIG. 3.

The bus emulation apparatus 901 comprises serial interface circuits 101 to 301, . . . , serial transfer paths 10S1 to 30S1, . . . and a hub circuit 801.

Note that the serial interface circuits 101 to 301, . . . are examples of the corresponding serial interface circuits 10 to 30, . . . in FIG. 1.

In the same way, the serial transfer paths 10S1 to 30S1, . . . are examples of corresponding serial transfer paths 10S to 30S, . . . in FIG. 1.

Also, the hub circuit 801 is an example of the hub circuit 80 in FIG. 1.

The serial interface circuits 101 to 301, . . . convert signals from corresponding peripheral circuits 191 to 391, . . . from parallel data to serial data and transfer to the hub circuit 801.

The hub circuit 801 operates a select calculation for selecting a signal to be supplied to peripheral circuits based on the serial data from the serial interface circuits 101 to 301.

The hub circuit 801 operates calculation indicated by $P1R1=P1C1 \times P1Q1+P2C1 \times P2Q2+P3C1 \times P3Q3+ \ldots$ The hub circuit 801 also operates a calculation indicated by $P1R2=P1C2 \times P1Q2+P2C2 \times P2Q2+P3C2 \times P3Q3+ \ldots$, and operates the same calculation on P1R3, . . .

The hub circuit 801 then supplies signals P1R1, P1R2, . . . as serial data to the respective serial transfer paths 10S1 to 30S1, . . .

The serial interface circuits 101 to 301, . . . connected to the serial transfer paths 10S1 to 30S1, . . . convert the serial data from the hub circuit 801 to parallel data and supply to the peripheral circuits 191 to 391, . . .

The peripheral circuits as the above transfer destination receives the signals P1R1, P1R2, . . . For example, by transmitting a signal indicating address information of the transfer destination to the peripheral circuit as the transfer destination, it is possible to notify the data transfer to the peripheral circuit as the transfer destination.

As explained above, one time transfer by the existing bus as in FIG. 3 can be emulated by the processing procedure of P/S conversion, serial transfer, signal selection calculation by the hub circuit, serial transfer and S/P conversion in the circuit configuration of the present invention.

Since the circuits shown in FIGS. 4A and 4B operate equivalently, the wired-OR calculation using the open drain type driver used in a part of the existing bus can performs emulation in the same way by the circuit configuration of the present invention.

The hub circuit 801 may divide the peripheral circuits 191 to 391, . . . into groups of peripheral circuits performing data transfer at the time of the above select calculation. For example, the peripheral circuits as the transfer destination may be narrowed down based on the serial interface circuit which transferred serial data to the hub circuit 801 and operates the select calculation corresponding to the narrowed down peripheral circuits.

As a result of the grouping, it is possible to perform emulation where a plurality of divided buses exist at a same time and to transfer data simultaneously between the plurality of groups, and calculation times of the select calculation can be reduced and the calculation time can be made short.

As explained above, the signal line (bus) and the bidirectional bus driver connected to the bus shown in FIG. 3 may be configured by the hub circuit 801 and the serial interface circuits 101 to 301, . . . By dynamically changing the logic calculation in the above hub circuit, the grouping can be also dynamically changed and data can be transferred in parallel at a time between the groups.

FIG. 6 is a view of the configuration of an example of a hub circuit of the bus emulation apparatus 90 in FIG. 1. Hereinafter, a method of emulating an existing bus at a functional level of a transfer using an address not at a level of the above bus driver, bus receiver and bus wiring.

The hub circuit 802 comprises address extraction circuits 181A, 182A, . . . , 18NA, buffer registers 181B, 182B, . . . , 18NB, transfer destination selection circuits 181C, 182C, . . . , 18NC and input selection circuits 181D, 182D, . . . , 18ND.

For example, an input terminal of the buffer register 181B is connected to the serial interface circuit 10 via the serial transfer path 10S.

Similarly, the buffer registers 182B to 18NB (note that N=7) are connected to serial interface circuits 20 to 70 via corresponding serial transfer paths 20S to 70S.

For example, an output terminal of the input selection circuit 181D is connected to the serial interface circuit 10 via the serial transfer path 10S.

Similarly, output terminals of the input selection circuits 182D to 18ND (note that N=7) are connected to the serial interface circuits 20 to 70 via corresponding serial transfer paths 20S to 70S.

Note that the buffer registers 181B, 182B, . . . , 18NB may be configured to be first-in first-out (FIFO) type buffers.

The connection relationships of the buffer registers 181B to 18NB, address extraction circuits 181A to 18NA, transfer destination selection circuits 181C to 18NC and input selection circuits 181D to 18ND have the same configuration. Now, a connection relationship of the buffer register 181B, address extraction circuit 181A, transfer destination selection circuit 181C and input selection circuits 181D to 18ND will be mainly explained.

The buffer register 181B is supplied with serial data from the serial interface circuit 10 via the serial transfer path 10S and holds the serial data.

The address extraction circuit 181A extracts address information of the transfer destination from the above serial data input to the hub circuit 802. Specifically, the address information is extracted from the serial data stored in the buffer register 181B.

The transfer destination selection circuit 181C selects a transfer path of the serial data stored in the buffer register 181B based on the address information extracted by the address extraction circuit 181A.

An input selection circuit corresponding to the above address information among the input selection circuits 181D to 18ND receives as an input the serial data from the transfer destination selection circuit 181C and supplies the input serial data to the serial interface circuit via the serial transfer path. The serial interface circuit is connected to a peripheral circuit as the transfer destination corresponding to the above address information.

The hub circuit 802 is capable of performing data transfer in parallel at a time by using different transfer paths.

Note that there is a possibility that a plurality of transfer requests are made to a same transfer destination in the hub circuit 802. To deal with such cases, it is preferable that a priority is determined in advance or a control circuit for determining priority is provided to transfer data based thereon.

FIG. 7 is a view of the configuration of an example of the hub circuit in the bus emulation apparatus 90 in FIG. 1.

The hub circuit 803 has a configuration where a control circuit 280P, a signal generation circuit 280 and detection circuits 281E to 28NE are further provided to the hub circuit 802 in FIG. 6. Note that same reference numerals are used for the same components as those in the hub circuit 802 in FIG. 6 and an explanation on the same components will be appropriately omitted.

The hub circuit 803 comprises a signal generation circuit 280, a control circuit 280P, detection circuits 281E to 28NE, address extraction circuits 181A to 18NA, buffer registers 181B to 18NB, transfer destination selection circuits 281C to 28NC and input selection circuits 281D to 28ND.

For example, an output terminal of the input selection circuit 281D is connected to the serial interface circuit 10 via the serial transfer path 10S.

Similarly, output terminals of the input selection circuits 282D to 28ND (note that N=7) are connected to the serial interface circuits 20 to 70 via the serial transfer paths 20S to 70S.

The connection relationships of the buffer registers 181B to 18NB, address extraction circuits 181A to 18NA, detection circuits 281E to 28NE, transfer destination selection circuits 281C to 28NC and the input selection circuits 281D to 28ND are configured in the same way. Here, the connection relationship of the buffer register 181B, address extraction circuit 181A, detection circuit 281E, transfer destination selection circuit 281C and input selection circuits 281D to 28ND will be mainly explained.

The buffer register 181B is supplied serial data from the serial interface circuit 10 via the serial transfer path 10S and stores the serial data therein.

The address extraction circuit 181A extracts address information of a transfer destination from the above serial data input to the hub circuit 803. For example, the address information is extracted from the serial data stored in the buffer register 181B.

The detection circuit 281E detects information indicating a burst transfer end and/or interrupt from the above serial data input to the hub circuit 803. Specifically, a burst transfer end and/or interrupt is detected from the serial data stored in the buffer register 181B and outputs a detection signal to the signal generation circuit 280.

The detection circuit 281E outputs a detection signal to the signal generation circuit 280 based on detection of marker data indicating the burst transfer end or based on detection that data transfer by the transfer path is not performed for a certain period of time.

The signal generation circuit 280 generates a burst transfer end flag or an interrupt signal based on the detection signal from the detection circuit 281E and supplies to the control circuit 280P.

The control circuit 280P takes in charge of, for example, the overall control of the hub circuit 803, supplies a priority control signal indicating priorities to the input selection circuits 281D to 28ND based on the burst transfer end flag or the interrupt signal from the signal generation circuit 280 and controls an order of the input selection circuits 281D to 28ND to select transfer destination selection circuits.

The control circuit 280P temporarily changes a priority determining algorithm of a round-robin, etc. based on the burst transfer end flag or interrupt signal and supplies a priority control signal indicating the changed priority to the input selection circuits 281D to 28ND. As an example, when a burst transfer abnormally ends, a priority control signal to give the highest priority to the transfer path at the time of performing the burst transfer again.

The control circuit 280P may be provided in the hub circuit 803 or outside of it.

The transfer destination selection circuit 281C selects a transfer path of the serial data stored in the buffer register 181B based on the address information extracted by the address extraction circuit 181A.

An input selection circuit corresponding to the above address information among the input selection circuits 281D to 28ND selects the transfer destination selection circuit 281C in accordance with the priority control signal, receives as an input the serial data from the selected transfer destination selection circuit 281C and supplies the input serial data to the serial interface circuit via the serial transfer path.

The hub circuit 803 is capable of performing data transfers in parallel at a time by using different transfer paths.

Also, when a plurality of transfer requests are made to the same transfer destination, data transfer can be performed in accordance with the priority. Also, priority may be added to peripheral circuits for performing data transfer.

In the hub circuit 802 in FIG. 6 and/or the hub circuit 803 in FIG. 7, a clock signal generation circuit for generating a clock signal having a plurality of frequencies may be provided to make a serial transfer rate of the buffer registers 181B to 18NB variable by the plurality of clock signals. Selection of the plurality of clock signals is performed, for example, in the control circuit 280P, and the clock signal generation circuit is comprised, for example, of a plurality of oscillation circuits.

By making the serial transfer rate of the buffer registers 181B to 18NB variable, it becomes possible to set the serial transfer rate in accordance with the characteristic of the respective serial transfer paths and peripheral circuits and to improve the credibility of data received by the peripheral circuits.

In the hub circuit 802 in FIG. 6 and/or the hub circuit 803 in FIG. 7, a direct memory access (DMA) controller for activating and ending a data transfer, generating an address of a transfer destination, etc. may be also provided.

For example, it may be configured to be provided with a DMA controller corresponding to the respective serial interface circuits (or respective peripheral circuits) connected to the hub circuit to control a transfer source address (source address), transfer destination address (destination address), read control signal, write control signal, word counter, etc. The DMA controller has a data transfer interface of at least two systems, wherein one of the two systems corresponds to peripheral circuits on a data transmitting side and the other corresponds to peripheral circuits on a data receiving side.

By providing the DMA controller in the hub circuit, the data transfer rate can be improved.

In the hub circuit 802 in FIG. 6 and/or the hub circuit 803 in FIG. 7, an oscillation circuit for generating a clock signal or a circuit for transmitting a clock signal from an outside apparatus may be provided. It may be configured that the clock signal for transferring serial data transmitted from the hub circuit to a serial interface circuit is received by a peripheral circuit and the peripheral circuit uses the received clock signal as a clock signal in the peripheral circuit.

By using the clock signal in common as above, an accurate synchronization can be attained between the hub circuit and the peripheral circuit, and an oscillation circuit for a clock signal can be omitted in the peripheral circuit receiving the clock signal.

Note that when a stationary clock signal is supplied from the hub circuit to the peripheral circuit, it may be configured to use it as it is in the peripheral circuit.

When an intermittent clock signal is supplied from the hub circuit to the peripheral circuit, it may be used as it is in the peripheral circuit, or the peripheral circuit may be configured to reproduce the clock signal in a clock reproduction circuit based on the intermittent clock signal to use.

Figure 8:
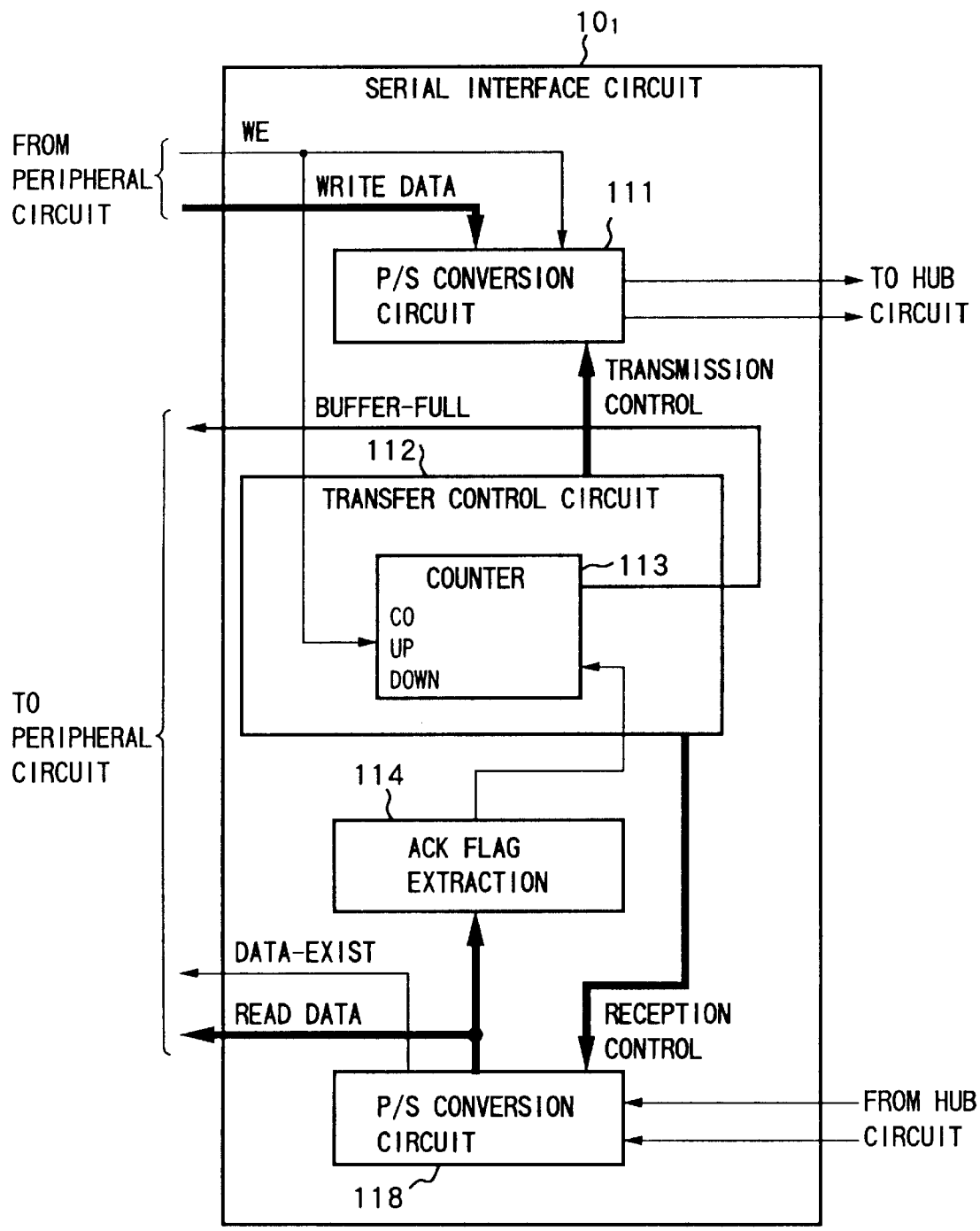
FIG. 8 is a view of the configuration of an example of a serial interface circuit in the bus emulation apparatus in FIG. 1.

FIG. 8 is a view of the configuration of an example of a serial interface circuit of the bus emulation apparatus 90 in FIG. 1.

The serial interface circuit 101 comprises a P/S conversion circuit 111, a transfer control circuit 112, a response flag detection circuit 114 and an S/P conversion circuit 118.

For example, the serial interface circuit 101 is connected to the peripheral circuit 19 via a parallel transfer path 19P and connected to the hub circuit 80 via a serial transfer path 10S.

The P/S conversion circuit 111 generates write data composed of parallel data based on the write control signal WE and write data from the peripheral circuit 19 and supplies the same to the hub circuit 80.

The S/P conversion circuit 118 supplies read data composed of parallel data, a signal indicating existence of the read data (Data-Exist), a response flag (response signal) ACK, etc. to the peripheral circuit 19 based on the signal from the hub circuit 80.

The response flag detection circuit 114 detects the response signal ACK from the data supplied from the hub circuit 80 to the S/P conversion circuit 118 and supplies a flag detection signal to the transfer control circuit 112.

The transfer control circuit 112 is a circuit for performing transmitting control and receiving control of the serial interface circuit 101 and comprises a counter 113. The transfer control circuit 112 performs transmittance control of the P/S conversion circuit 111 and receiving control of the S/P conversion circuit 118 based on a count value of the counter 113.

The counter 113 counts the number of data in a buffer (buffer register) in the hub circuit 80. The counter 113 increases the count value by exactly one for every data transmission and generates a carry signal at a value which fulfills the buffer.

The carry signal is sent as a buffer-full signal to a peripheral circuit on the data transmitting side, and data transmission by the peripheral circuit is temporarily suspended until the buffer obtains some vacancy.

The counter 113 decreases the count value by exactly one and stops outputting the carry signal when the flag detection circuit 114 detects the response signal ACK indicating that the buffer capacity obtained one vacancy.

As explained above, data transfer in a handshake method becomes possible between the buffer in the hub circuit 80 and the serial interface circuit 101.

Cache Mechanism

Figure 9:
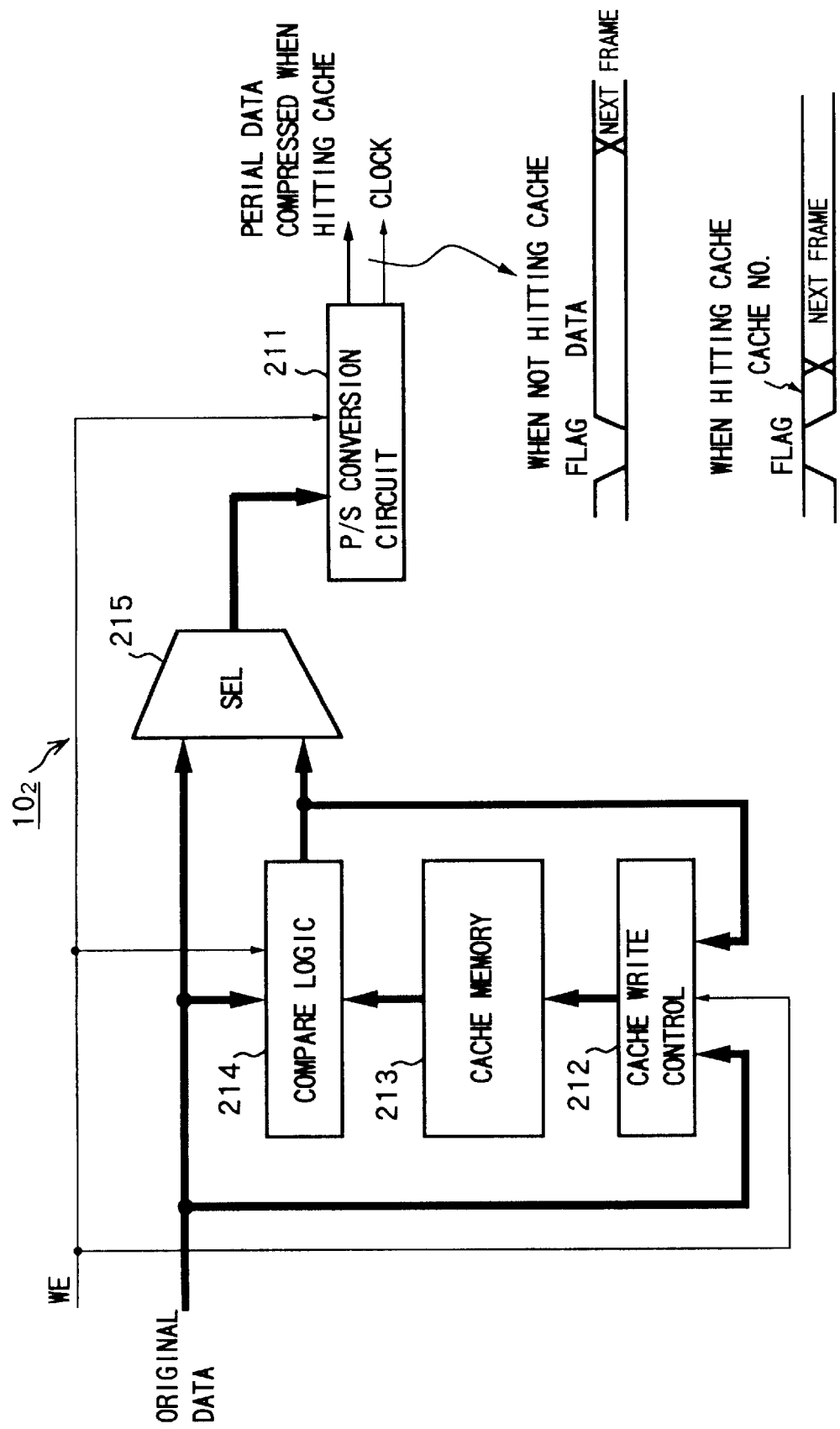
FIG. 9 is a view of the schematic partial configuration of an example of a part of the configuration from a portion being input a signal from a peripheral circuit to a P/S conversion circuit in a serial interface circuit in the bus emulation apparatus in FIG. 1.

FIG. 9 is a view of the partial configuration from a portion a signal is input from the peripheral circuit to the P/S conversion circuit in the serial interface circuit in the bus emulation apparatus 90 in FIG. 1.

The serial interface circuit 102 comprises a write control circuit 212, a cache memory 213, a comparison circuit 214, a selection circuit 215 and a P/S conversion circuit 211.

The serial interface circuit 102 realizes an effective data transfer due to the cache mechanism.

In the bus emulation apparatus using the serial interface circuit 102, for example, the address information and/or transfer data is overwrite copied in cache memories respectively provided in the serial interface circuit 102 and the hub circuit 80.

Then, whether or not the same address information or data as the one used for a transfer exists in the cache memories is checked before starting the transfer, and when there is, a pointer value is sent to the cache memory instead of transmitting the address information or the data itself. A flag bit is provided at the top of the serial data for distinguishing a normal transfer of address information or data from a transfer of a pointer value.

For example, the write control circuit 212 is supplied transfer data and a write enable signal WE from a peripheral circuit and an output signal of the comparison circuit 214 at the same time.

The write control circuit 212 writes the transfer data from the peripheral circuit in the cache memory 213 based on the write enable signal WE and the output signal of the comparison circuit 214.

The cache memory 213 temporarily stores the transfer data written by the write control signal 212 and supplies the same to the comparison circuit 214.

The comparison circuit 214 compares the transfer data from the peripheral circuit with the transfer data (cache data) from the cache memory 213 and outputs a signal indicating the comparison result to the selection circuit 215.

As the result of the comparison in the comparison circuit 214, when the transfer data from the peripheral circuit and cache data are matched, that is, when hitting the cache, the comparison circuit 214 outputs a pointer value indicating the matched portion to the selection circuit 215.

The selection circuit 215 outputs the pointer value to the P/S conversion circuit 211 and sets a flag indicating transmission of the pointer value at the top of the serial data.

The P/S conversion circuit 211 is able to compress and transfer the data due to the outputting of the pointer value and flag.

In the hub circuit 80, the same data is extracted from the cache memory in the hub circuit based on the flag and the pointer value and the data transfer rate can be improved by copying the extracted data to the buffer register in the hub circuit.

When the transfer data and the cache data are not matched as the result of the comparison in the comparison circuit 214, that is, not hitting the cache, the comparison circuit 214 outputs a mismatch signal indicating the mismatch to the selection circuit 215.

The selection circuit 215 outputs the transfer data from the peripheral circuit to the P/S conversion circuit 211 based on the mismatch signal. Also, the write control circuit 212 overwrites the transfer data form the peripheral circuit in the cache memory 213 based on the mismatch signal.

In the serial interface circuit 102 in FIG. 9, the comparison circuit 214 adds and/or subtracts exactly one to/from cache data to generate calculation data when comparing the transfer data from the peripheral circuit with the cache data, and also performs comparison on the generated calculation data.

When the transfer data from the peripheral circuit and the calculation data are matched, a flag indicating the calculation of ±1 is set at the top of the serial data of the P/S conversion circuit 211.

For example, in the case of address information or simple data, it differs only ±1 from the previous transfer data in some cases, thus, it is possible to make the data transfer more effective.

Note that in the case that a fixed length of one frame is determined on the both transmitting and receiving sides at first at the time of a serial transfer, when a string of data of remaining transfer bits becomes the same as that in the previous time during the serial transfer of one frame of data, a frame complete signal is sent and transfer of the one frame ends. On the receiving side, it may be configured to take out the required remaining bits of the string of data from the previously received data.

As explained above, when the following data is the same as the preceding data in the middle of a serial transfer of one frame, an effective data transfer can be attained by suspending the one-frame transmission on the receiving side in the middle and by bringing the remaining bits from the preceding one to the receiving side.

Also, the P/S conversion circuit 211 may be configured to generate address serial data having a short data length by assigning a shorter pattern comparing with that of other address information when performing parallel to serial conversion on address information of a frequency used port and address information of a port requiring a high transfer rate.

By making the serial data length of the address information short, an effective data transfer can be attained.

Figure 10:
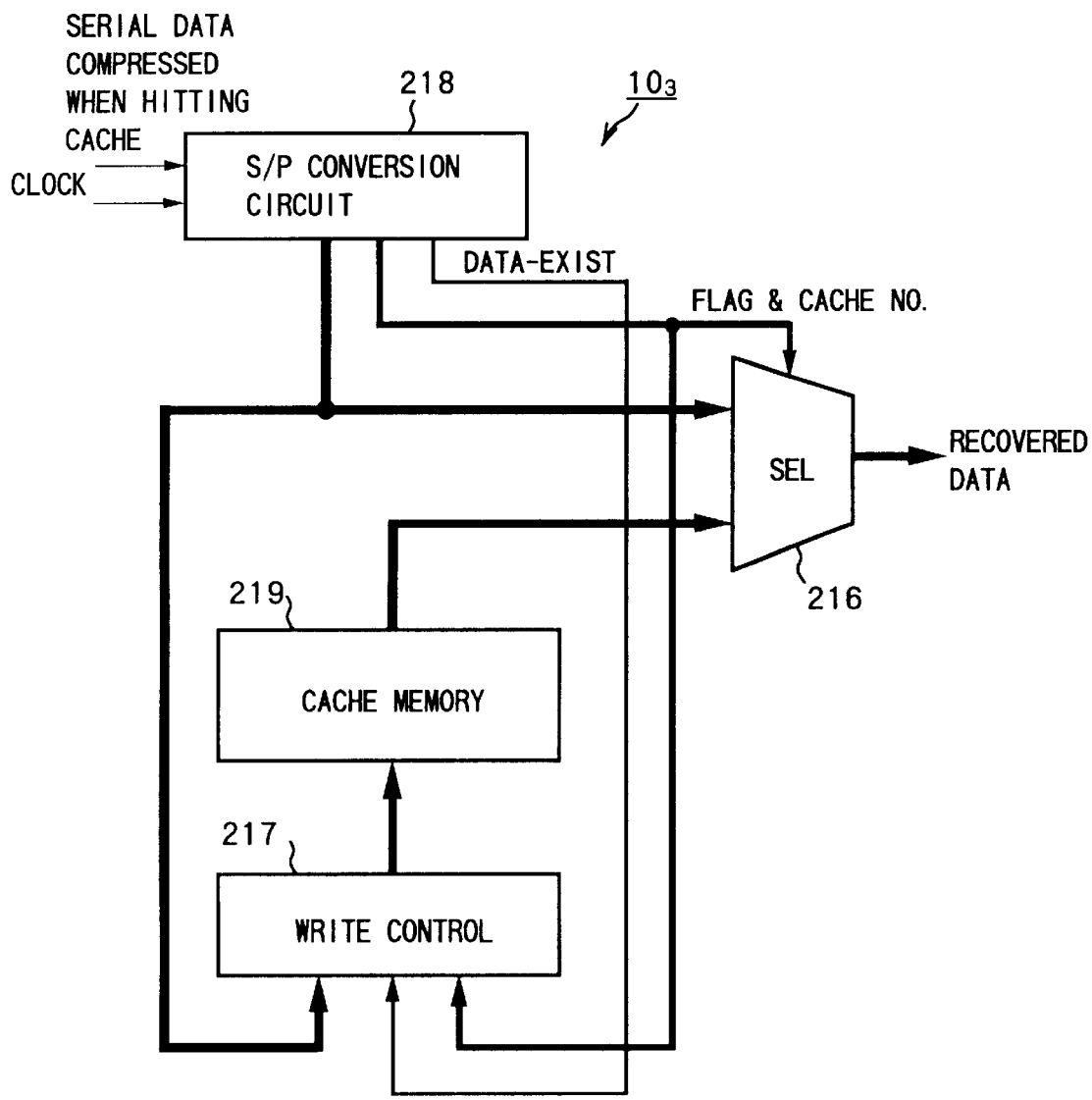
FIG. 10 is a view of the schematic partial configuration of an example of a part of the configuration from a portion being input a signal from a hub circuit to a portion recovering the parallel data in a serial interface circuit in the bus emulation apparatus in FIG. 1.

FIG. 10 a view of a partial configuration of an example from a portion being input a signal from a hub circuit 80 to a portion recovering parallel data in a serial interface circuit in the bus emulation apparatus 90 in FIG. 1.

The serial interface circuit 103 comprises a write control circuit 217, a cache memory 219, a selection circuit 216 and an S/P conversion circuit 218.

The serial interface circuit 103 realizes an efficiency of a data transfer by the cache mechanism.

In the bus emulation apparatus using the serial interface circuit 103, address information and/or transfer data is overwrite copied in the respective cache memories in both of the serial interface circuits 103 and 102. Between the serial interface circuits 102 and 103 is formed a transfer path via the hub circuit 80.

The S/P conversion circuit 218 is supplied serial data from the hub circuit 80, converts the supplied data to parallel data and supplies the same to the selection circuit 216 and the write control circuit 217.

The write control circuit 217 is supplied the parallel data from the S/P conversion circuit 218, an existence signal (Data-Exist) indicating that data exists in the S/P conversion circuit 218, the above flag and pointer value.

The write control circuit 217 writes output data of the S/P conversion circuit 218 to the cache memory 219 based on the existence signal, flag and pointer value.

The cache memory 219 temporarily stores transfer data written by the write control circuit 217 and supplies the same to the selection circuit 216.

The selection circuit 216, when the above flag indicates the existence of the pointer value, that is, hitting the cache, extracts a portion corresponding to the pointer value from the transfer data (cache memory) stored in the cache memory 219 to generate recovered data based on the pointer value and transmits the recovered data as a parallel data to a peripheral circuit.

On the other hand, the selection circuit 216, when the above flag indicates an absence of the pointer value, that is, not hitting the cache, selects the parallel data from the S/P conversion circuit 218 and transmits the same to the peripheral circuit. Also, the write control circuit 217 overwrites the parallel data from the S/P conversion circuit 218 in the cache memory 219.

In the serial interface circuit 103, when the flag indicates ±1 calculation, the write control circuit 217 operates ±1 calculation on the cache data and the same data as the above calculation data is selected in the selection circuit 216 and supplied to the peripheral circuit.

Note that when the serial data of this time supplied from the serial interface circuit as the transfer source via a serial transfer path is exactly identical or substantially identical with the preceding serial data, the hub circuit generates a flag indicating the identity or approximate identity. Then, the serial interface circuit 103 connected to a peripheral circuit as a transfer destination may be configured to generate parallel data of this time based on the parallel data stored in the cache memory 219 storing the previous parallel data corresponding to the previous serial data from the above hub circuit.

Test

In the bus emulation apparatus 90, by providing a switching circuit in the serial interface circuit for switching an outputting signal of the S/P conversion circuit to an input signal of the P/S conversion circuit and by forming a loop between the hub circuit and the serial interface circuit, a data transfer test can be conducted.

In this case, a loop is formed by one serial transfer path (single direction signal transfer path ×2), data is transmitted and received at a plurality of transfer rates on the serial transfer path and a data error is detected. Based on the test result, an optimal transfer rate and/or transfer clock frequency is detected and used.

Specifically, the transfer test is conducted as below.

When communicating between the serial interface circuit and hub circuit, a flag indicating a kind of data is added and a flag form indicating a start or end of the transfer test is prepared in the kinds.

A circuit controlling inside the hub circuit or an external system transmits a transfer test starting flag to the serial interface circuit via the hub circuit after performing initial resetting of the system. The serial interface circuit which received the transfer test flag becomes a test mode and converts the parallel data generated in the S/P conversion circuit to serial data in the P/S conversion circuit and transmits the same.

In the test mode, a test system is configured so that the serial data sent from the hub circuit makes U-turn and returns to the hub circuit.

In the test system, the serial data is sent by a plurality of transfer rates from the hub circuit, the returned serial data is received, and it is detected whether or not there is a data error between both the sent serial data and the received serial data.

Also, when an adjustment mechanism, such as a delay time adjustment, slew rate adjustment, threshold voltage (Vth) adjustment, terminal resistance value adjustment, transmitting/receiving clock frequency adjustment, etc., is provided on an input/output (I/O) portion of the serial interface circuit and hub circuit, appropriate condition is detected by using the above test system and adjusted.

Note that the hub circuit 80 may be configured to conduct a connection test of the above plurality of serial interface circuits 10 to 70 and the hub circuit 80 and a self test during a spare time of data transfers.

The hub circuit 80 may be provided with a monitor circuit for monitoring data transfer state for debugging and testing. The monitor circuit has a function of monitoring (snooping) operation states of the respective ports transmitting and receiving data to and from the serial interface circuit, and monitors and reports in accordance with an instruction from a control circuit inside the hub circuit or an external system control circuit. For example, the monitor circuit monitors and reports an operation state of the buffer register, or monitors an output signal of the detection circuits 281E to 28NE and an output signal of the signal generation circuit 280 and reports to the control circuit and/or control system performing transfer controls and error recovery, etc.

The hub circuit 80 may be provided with a virtual port emulation function.

For example, a virtual port emulation function of transferring data by a specific connection port pretending other connection port or a not existing virtual connection port may be provided in the hub circuit during debugging. Specifically, a function of switching port addresses of the respective connection ports is provided (a register for determining a port address for the respective ports is provided for enabling to switch at initial setting).

The hub circuit 80 may be configured to supply serial data from a specific serial interface circuit among the plurality of serial interface circuits 10 to 70 to a serial interface circuit connected to a different peripheral circuit from the one as a transfer destination indicated by address information in the serial data.

Figure 11:
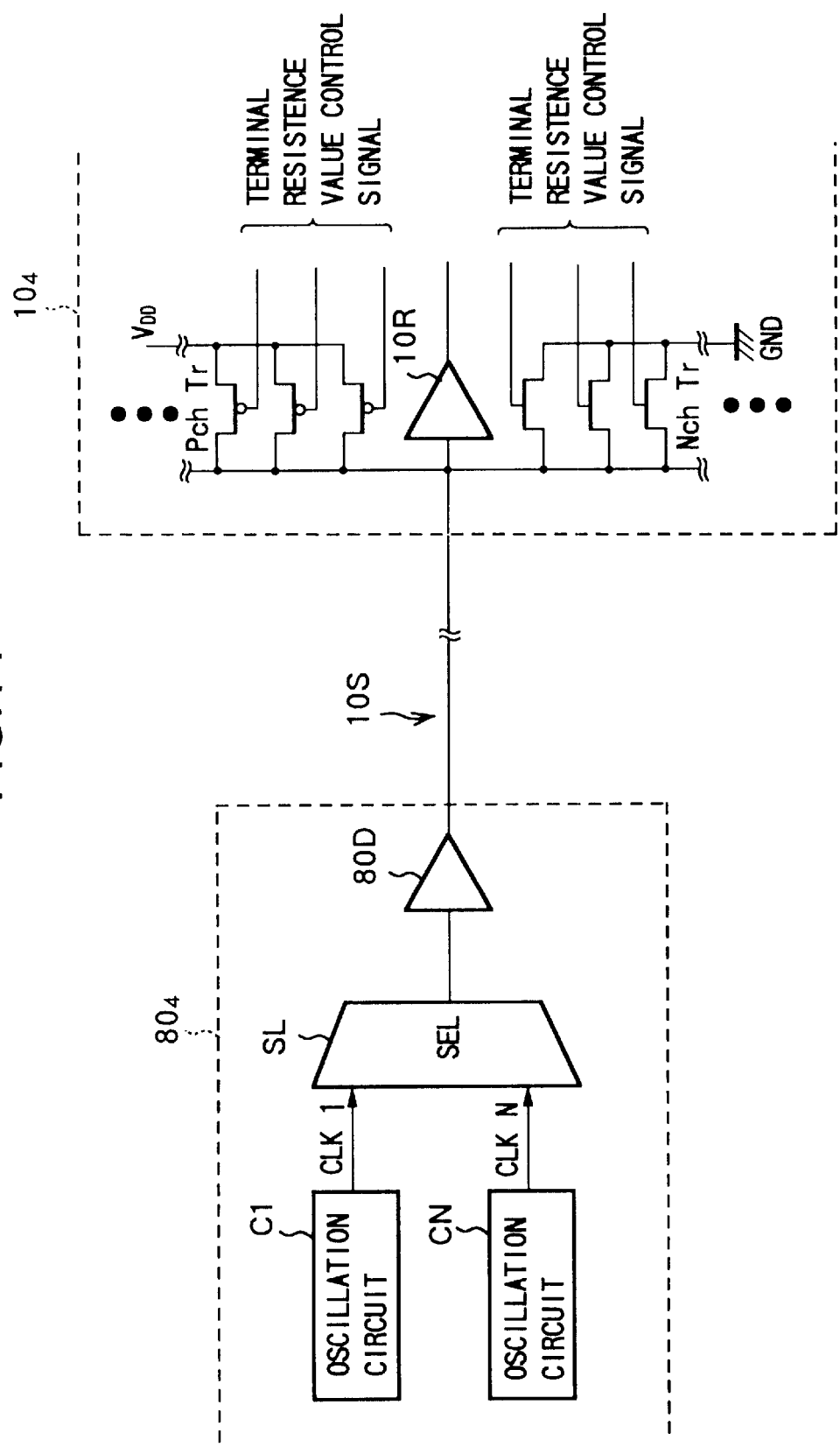
FIG. 11 is a view of the configuration of an example of a hub circuit and a serial interface circuit in the bus emulation apparatus in FIG. 1.

FIG. 11 is a view showing a configuration of an example of a hub circuit and a serial interface circuit in the bus emulation apparatus 90 in FIG. 1 and a view of the configuration of an example of a serial interface circuit having a plurality of transistors for terminating transfer paths.

The hub circuit 804 comprises oscillation circuits C1 to CN for generating a plurality of clock signals CLK1 to CLKN having different frequencies and a selector SL, and the selector SL selects a specific clock signal among the clock signals CLK1 to CLKN by a selection control signal from a not shown control circuit and supplies the same to a bus driver 80D.

The serial interface circuit 104 comprises a bus receiver 10R for receiving a clock signal sent from the bus driver 80D in the hub circuit 804. A plurality of transistors connected in parallel are connected on an input side of the bus receiver 10R. Note that the bus receiver 10R may be a bus receiver for receiving serial data instead of the clock signal.

A source of an n-channel type filed effect transistor (Pch FET) is grounded to be an earth potential GND, a drain is connected to an input terminal of the bus receiver 10R and a gate is supplied a control signal of a terminal resistance value from a not shown control circuit in the serial interface circuit 104.

A source of a p-channel type field effect transistor (Nch FET) is supplied a power source voltage VDD, a drain is connected to an input terminal of the bus receiver 10R and a gate is supplied a control signal of a terminal resistance value from a control circuit in the serial interface circuit 104.

A plurality of transistors are selectively set to be an on state by the control signal of the terminal resistance value, and the terminal resistance value of the bus receiver 10R can be set.

Note that in the bus receiver in the hub circuit 804 for receiving the serial data transmitted from the bus driver in the serial interface circuit 104, in the same way as in FIG. 11, the terminal resistance value can be set by connecting a plurality of transistors on the input side of the bus receiver and selectively setting to be an on state.

Figure 12:
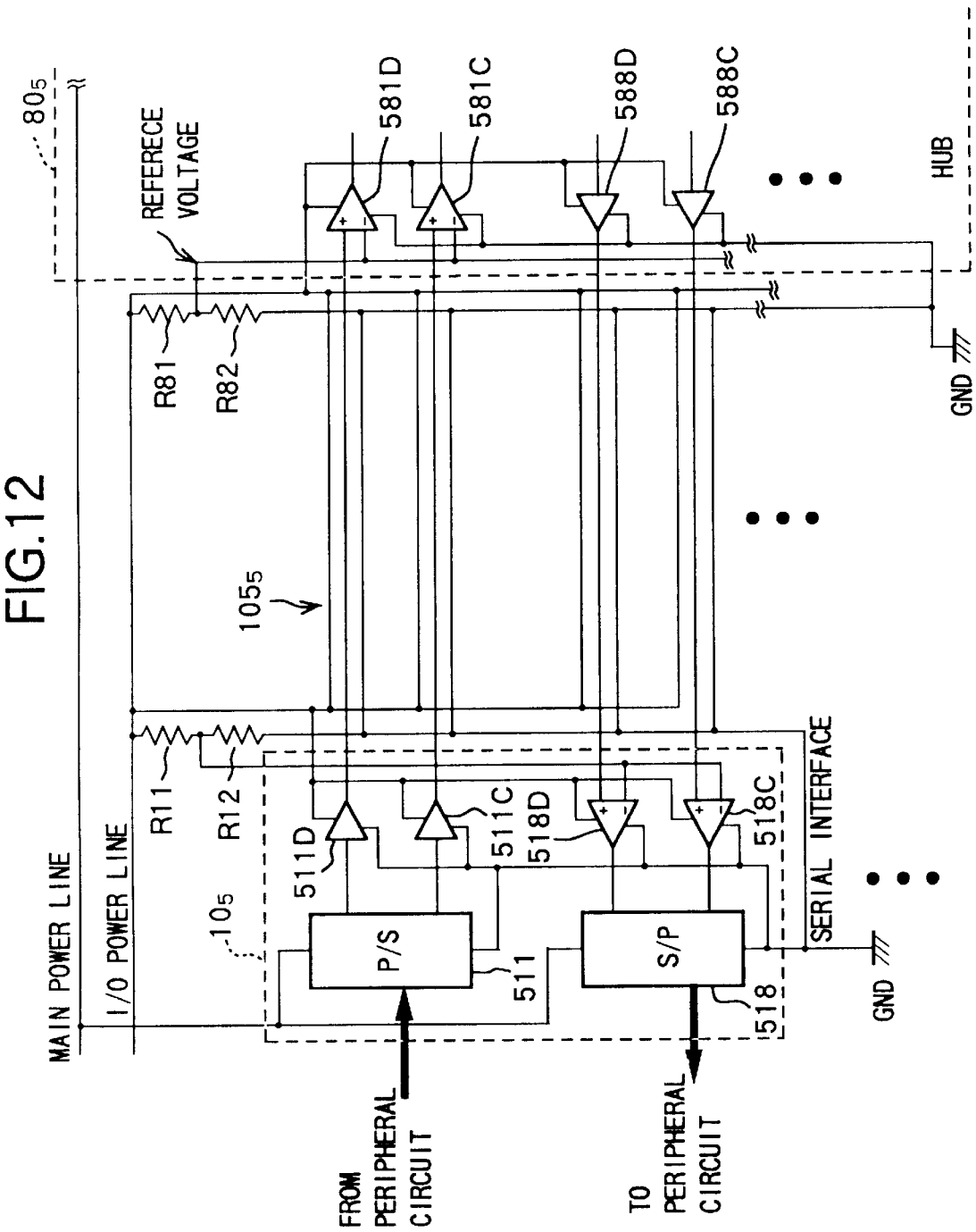
FIG. 12 is a view of the configuration of an example of a connection form of a serial interface circuit and a hub circuit in the bus emulation apparatus in FIG. 1.

FIG. 12 is a view of the configuration of an example of a connection form of a serial interface circuit and a hub circuit in the bus emulation apparatus 90 in FIG. 1.

A serial interface circuit 105 comprises a P/S conversion circuit 511, an S/P conversion circuit 518, bus drivers 511C and 511D, and bus receivers 518C and 518D. The serial interface circuit 105 and the hub circuit 805 are connected via a transfer path 10S5.

The bus driver 511C transmits a clock signal from the P/S conversion circuit 511 to the bus receiver 581C in the hub circuit 805.

The bus driver 511D transmits serial data from the P/S conversion circuit 511 to the bus receiver 581D in the hub circuit 805.

The bus receiver 518C receives a clock signal from the bus driver 588C in the hub circuit 805.

The bus receiver 518D receives serial data from the bus driver 588D in the hub circuit 805.

A main power line supplies a power source voltage to the serial interface circuit 105 and the hub circuit 805.

An I/O power line for supplying a power source voltage for driving the bus drivers and bus receivers is connected to power source terminals of the bus drivers 511C, 511D, 588C and 588D and bus receivers 518C, 518D, 581C and 581D.

In the serial transfer path 10S5, the I/O power line for driving is used as a shield of a signal line of the serial transfer path 10S5 along with a ground line. Also, by using the same power source voltage from the common I/O power line for the bus drivers 511C, 511D, 588C and 588D, it is possible to reduce power consumption in transmitting/receiving serial data between IC chips having different power source voltages and to reduce power consumption by smaller amplitude of the signal.

The bus receivers 518C, 518D, 581C and 581D are comprised of a differential type amplification circuit, a non-inversed input terminal is connected to a signal line, an inversed input terminal is supplied a voltage generated by dividing the power source voltage of the I/O power line for driving, and the differential type amplification circuit receives serial data form the serial transfer path 10S5 and outputs the same.

A power source voltage for driving from the above I/O power line for driving is divided by resistence R11 and R12 on the serial interface circuit 105 side and divided by resistence R81 and R82 on the hub circuit 805 side, and by using a voltage (reference voltage) generated thereby as an input of the serial data, it is possible to transmit/receive data by using a common power source voltage. Note that it is possible to divide the driver power source voltage by operating switched capacitor calculation so as to use as an input threshold at the time of inputting a signal of serial data.

Figure 13:
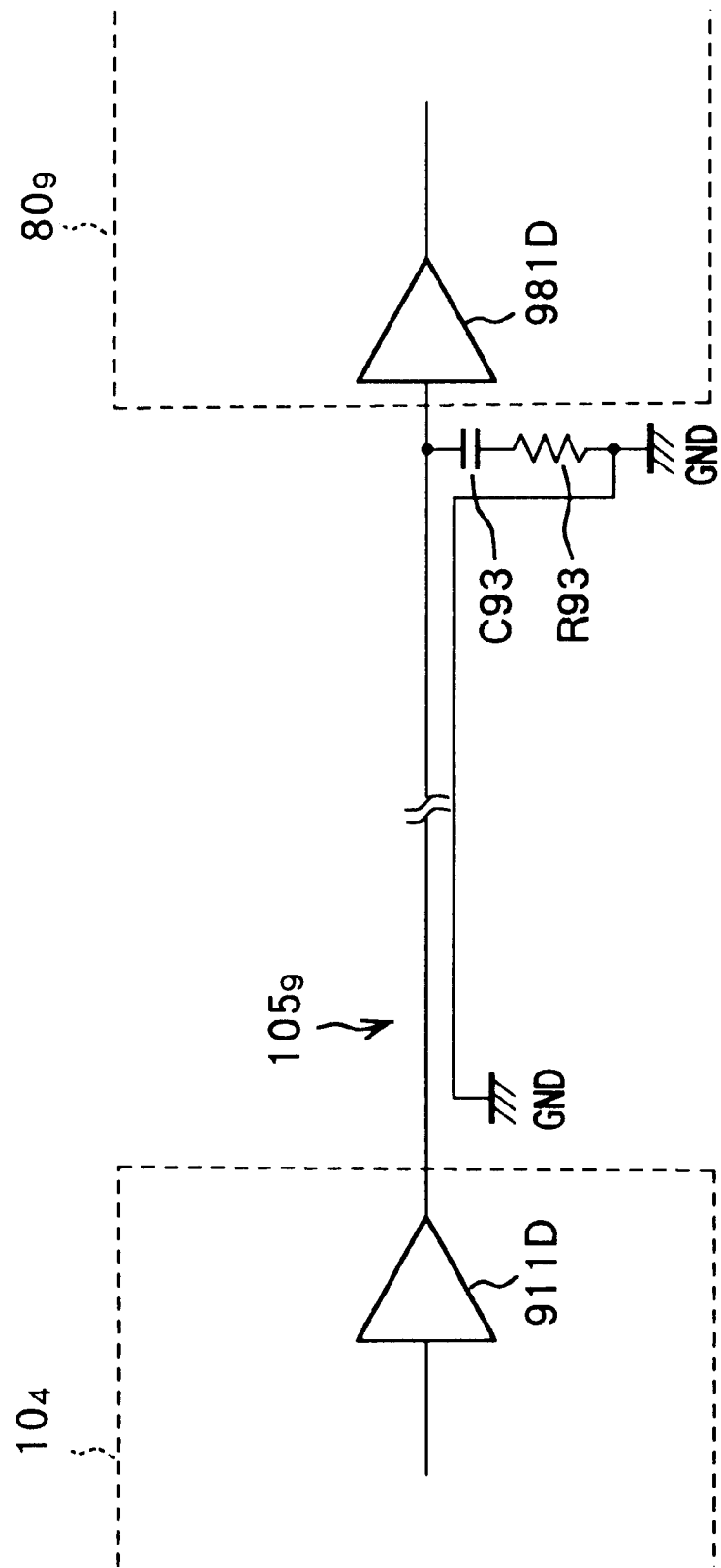
FIG. 13 is a view of the configuration of a serial transfer path in the bus emulation apparatus in FIG. 1.

FIG. 13 is a view of the configuration of an example of a serial transfer path in the bus emulator apparatus 90 in FIG. 1.

The bus driver 911D in the serial interface circuit 109 transmits the serial data to the bus receiver 981D in the hub circuit 809 via the serial transfer path 10S9.

In the serial transfer path 10S9, a capacitor C93 and a terminal resistance element R93 connected in series are terminated by connecting to or near a receiving terminal, and furthermore, a signal line where the serial data passes is shielded by a line of a ground potential GND. The capacitor C93 and the terminal resistance element R93 can prevent a current from flowing to the ground line from the terminal resistance and a power consumption can be reduced during the data transfer.

Note that a circuit for switching an input circuit for performing differential inputting with a circuit for performing a plurality of single inputting and one reference voltage inputting may be provided as an input/output (I/O) cell at an input/output portion.

Also, a circuit for switching a single output, differential output or multi-drive output may be provided at the input/output portion for adjusting a slew rate to effectively use an input/output pin.

Figure 14:
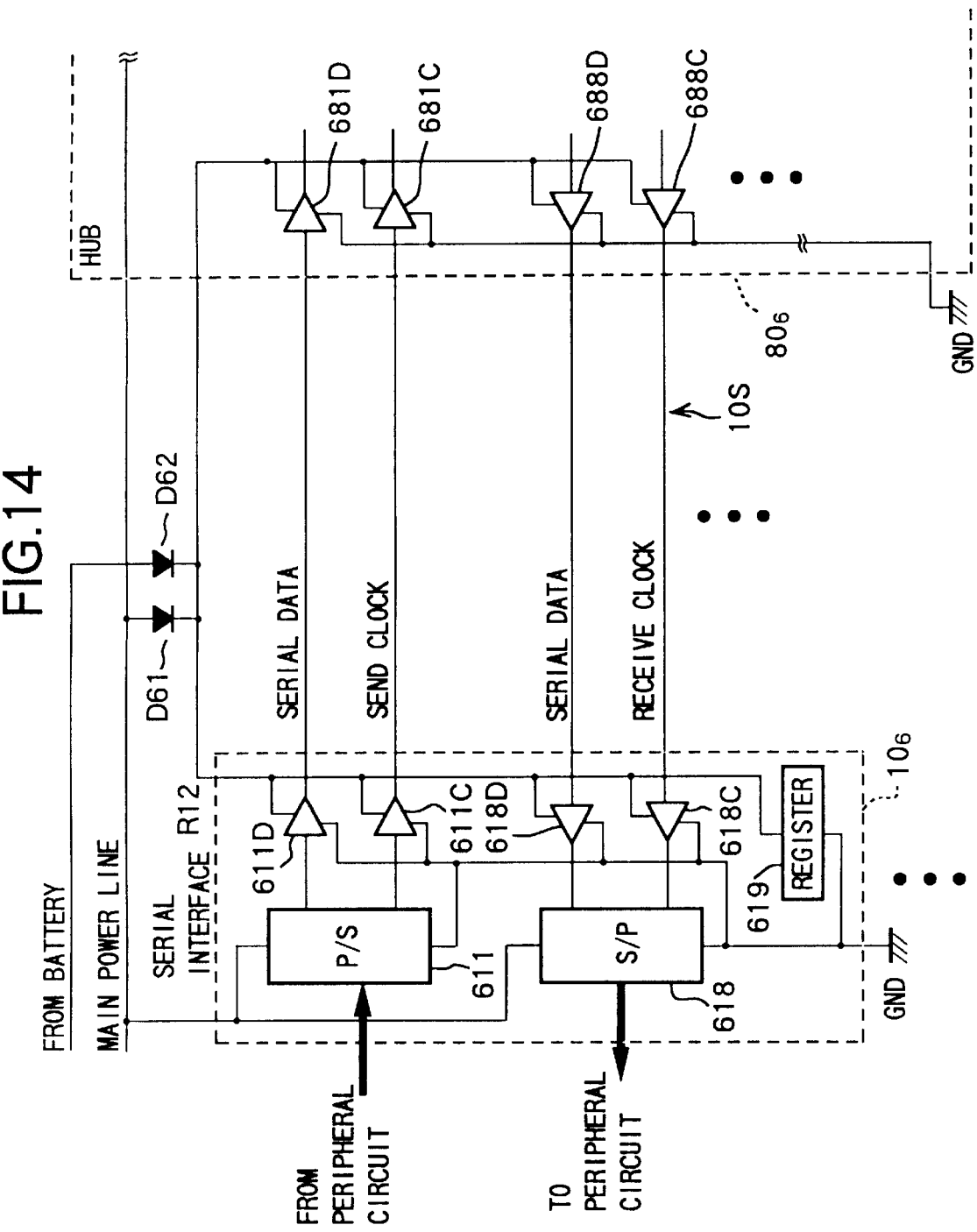
FIG. 14 is a view of the configuration of an example of a connection form of a serial interface circuit and a hub circuit in the bus emulation apparatus in FIG. 1.

FIG. 14 is a view of the configuration of an example of a connection form of a serial interface circuit and hub circuit in the bus emulation apparatus 90 in FIG. 1.

The serial interface circuit 106 comprises a P/S circuit 611, an S/P conversion circuit 618, bus drivers 611C and 611D, bus receivers 618C and 618D and a register 619. The serial interface circuit 106 and the hub circuit 806 are connected via the serial transfer path 10S.

The bus driver 611C transmits a clock signal from the P/S conversion circuit 611 to the bus receiver 681C in the hub circuit 806.

The bus driver 611D transmits the serial data from the P/S conversion circuit 611 to the bus receiver 681D.

The bus receiver 618C receives a clock signal from the bus driver 688C in the hub circuit 806.

The bus receiver 618D receives the serial data from the bus driver 688D in the hub circuit 806.

The main power line supplies a power source voltage to the serial interface circuit 106 and the hub circuit 806 and supplies a power source voltage for driving the bus drivers and bus receivers. The main power line is connected to the bus drivers 611C, 611D, 688C and 688D and power source terminals of the bus receivers 618C, 618D, 681C and 681D.

The hub circuit 806 supplies an I/O power source voltage or an input reference power source voltage to the serial interface circuit 106 via the main power line.

Note that when a power source is fail, such that an AC power source of the hub circuit 806 drops, the power source voltage for backup is supplied from a not shown battery instead of a power source voltage from the main power line.

Between the battery and the main power line is connected diodes D61 and D62 to prevent backward flows.

Due to the back up power source voltage, an identification signal and/or a code key of an IC chip is stored in the register 619 in the peripheral chip (an IC chip in the serial interface circuit), and the identification signal and/or code key is used for coding or decoding for communication. Note that a random access memory (RAM) may be used instead of the register 619.

Coding and Decoding

It may be configured to add an exclusive-OR (XOR) gate or a selector, etc. to a shift register in the P/S conversion circuit and S/P conversion circuit so that the P/S conversion circuit encodes transfer data and the S/P conversion circuit decodes the transfer data.

Figure 15:
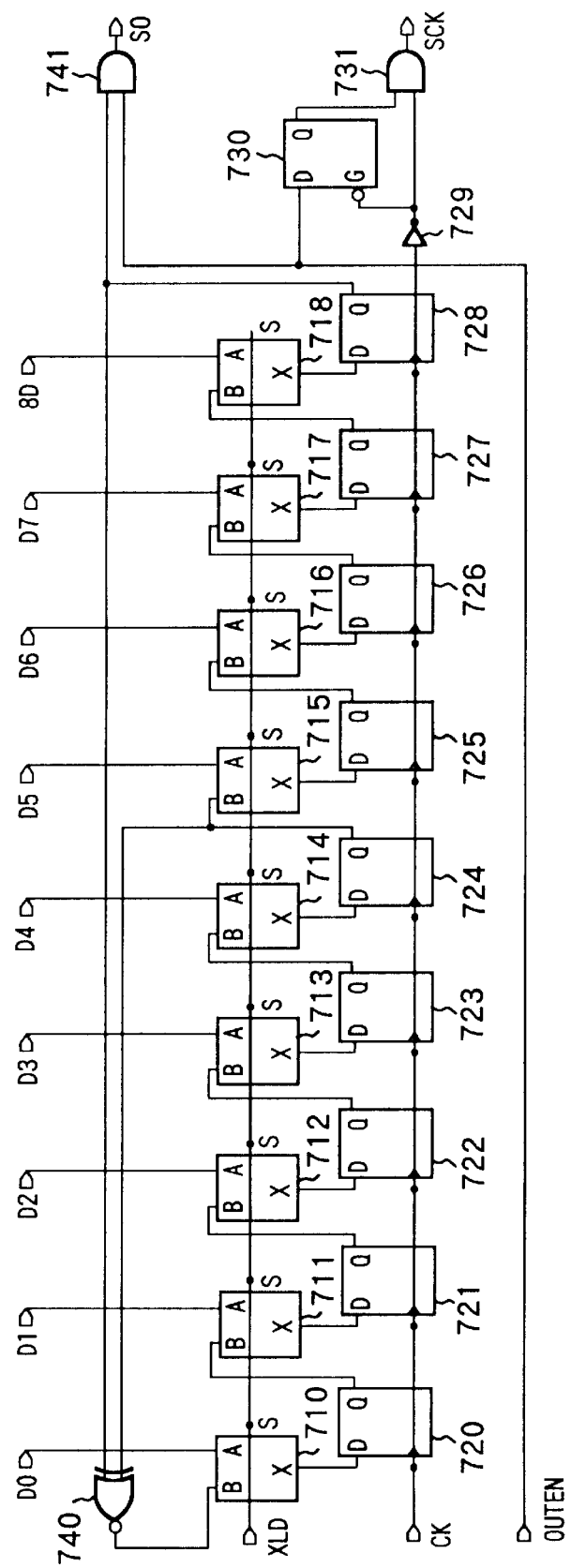
FIG. 15 is a circuit diagram of an example of a P/S conversion circuit in a serial interface circuit in the bus emulation apparatus in FIG. 1.

FIG. 15 is a circuit diagram of an example of the P/S conversion circuit in the serial interface circuit in the bus emulation apparatus 90 in FIG. 1.

The P/S conversion circuit 111 comprises selectors 710 to 718, D-type flip-flops (DFF) 720 to 728, an inversion circuit 729, OR circuits 731 and 741, an exclusive-NOR 740 and a flip-flop (FF) 730.

Parallel data D0 to D8, a starting signal XLD, an output approval signal OUTEN and a clock signal CK are supplied, for example, from a peripheral circuit connected to the P/S conversion circuit 111 or from a control circuit in the serial interface circuit having the P/S conversion circuit 111.

The selectors 710 to 718 are supplied the encode starting signal XLD at an input terminal S, selects a signal supplied to an input terminal A and outputs to an output terminal X when the starting signal XLD is at a low level, while selects a signal supplied to an input terminal B and outputs to the output terminal X when the starting signal XLD is at a high level.

The input terminals A of the selectors 710 to 718 are supplied corresponding parallel data D0 to D8.

The input terminals B of the selectors 711 to 718 are supplied output signals from output terminals Q of the corresponding DFF 720 to 727.

Input terminals D of the DFFs 720 to 728 are supplied output signals from the output terminal X of the corresponding selectors 710 to 718.

Clock input terminals of the DFFs 720 to 728 are supplied clock signals CK.

The EXNOR circuit 740 is supplied output signals of the DFFs 724 and 728 and a negative value of an exclusive-OR (XOR) of the supplied signal is supplied to the input terminal B of the selector 710.

In the FF 730, an output approval signal OUTEN is supplied to the input terminal D and an output signal is supplied from the output terminal Q to an AND circuit 731. The FF 730 latches the output approval signal OUTEN and supplies the latched value from the output terminal Q to the AND circuit 731 when the clock signal CK is at a high level.

The inversion circuit 729 inverts the clock signal CK and supplies the inverted signal to an input terminal G of the FF 730 and the AND circuit 731.

The AND circuit 731 calculates an AND of the output signal of the inversion circuit 729 with the output signal of the FF 730 and outputs the calculation result as a transfer clock signal SCK.

The AND circuit 741 is supplied an output signal of the DFF 728 and the output approval signal OUTEN and outputs the output signal of the DFF 728 as an output signal SO when the output approval signal OUTEN is at a high level. The output signal SO is encoded serial data.

In the P/S conversion circuit 111, data stored in the DFFs 720 to 728 stored in the DFFs 720 to 728 is circulated and encoded by the clock signal CK when the starting signal XLD is at a high level.

The number of pulses (or a clock period) of the clock signal CK from when the starting signal becomes a high level till when the output approval signal OUTEN becomes a high level corresponds to an encode key, for example, the number of the pulses is assumed to be 10.

Figure 16:
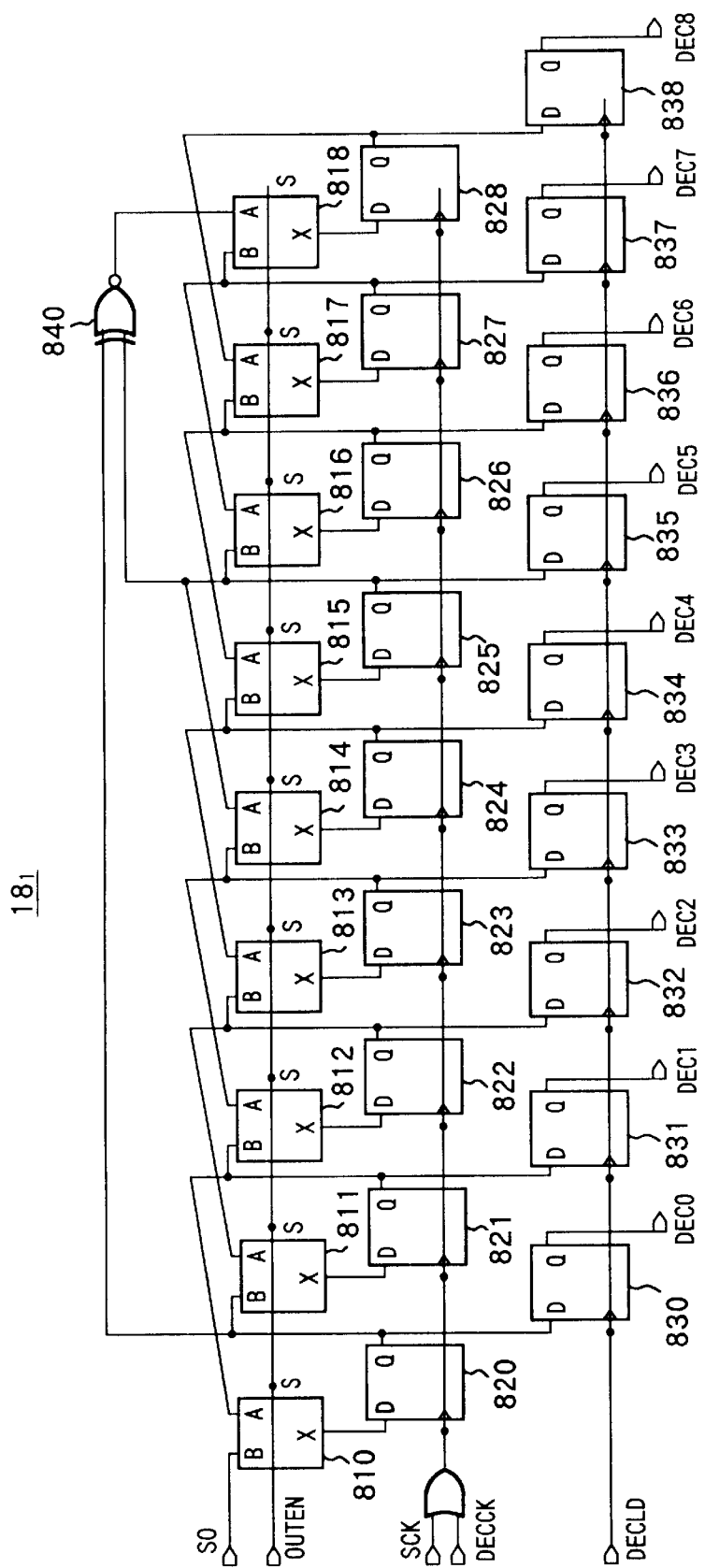
FIG. 16 is a circuit diagram of an example of an S/P conversion circuit in the serial interface circuit in the bus emulation apparatus in FIG. 1.

FIG. 16 is a circuit diagram of an example of the S/P conversion circuit in the serial interface circuit in the bus emulation apparatus 90 in FIG. 1.

The S/P conversion circuit 181 comprises selectors 810 to 818, DFFs 820 to 828 and 830 to 838, an exclusive-NOR (EXNOR) circuit 840 and an OR circuit 819.

Note that a signal OUTEN, a clock signal DECCK and a load signal DECLD in FIG. 16 are supplied, for example, from a control circuit in a serial interface circuit having the S/P conversion circuit 181.

The selectors 810 to 818 are supplied the signal OUTEN to an input terminal S, selects a signal supplied to an input terminal B and outputs to an output terminal X when the signal OUTEN is at a high level, while selects a signal supplied to an input terminal A and outputs to the output terminal X when the signal OUTEN is at a low level.

The input terminal B of the selector 810 is supplied the serial data SO.

The input terminals B of the selectors 811 to 818 are supplied output signals from the output terminals Q of the corresponding DFFs 820 to 827.

The input terminal A of the selectors 810 to 817 are supplied output signals from the output terminals Q of the corresponding DFFs 821 to 828.

The OR circuit 819 calculates an OR of the transfer clock signal SCK with the decode clock signal DECCK and supplies the calculation result to clock input terminals of the DFFs 820 to 828.

The exclusive-NOR (EXNOR) circuit 840 supplies to the input terminal A of the selector 818 a negative value of an XOR of the output signal of the DFF 820 with the output signal of the DFF 825.

The input terminals D of the DFFs 830 to 838 are supplied output signals of the corresponding DFFs 820 to 828, the clock input terminals are supplied decode clock signals DECCK and output signals DEC0 to DEC8 from the output terminals Q are output as parallel data.

The DFFs 820 to 828 latch the serial data SO based on the clock signal SCK when the signal OUTEN is at a high level.

Next, the signal OUTEN becomes a low level and data stored in the DFFs 820 to 828 is circulated and encoded by the clock signal DECCK. by the clock signal DECCK.

The number of pulses of the decode clock signal DECCK corresponds to the encode key and the number of pulses of 10 used at the time of encoding in the P/S conversion circuit 111 in FIG. 15 is used.

In this case, when the number of pulses in the clock signal DECCK becomes 10, the load signal DECLD becomes a pulsed high level, the data stored in the DFFs 820 to 828 are copied to the DFFs 830 to 838, and parallel data DEC0 to DEC8 are generated.

Figure 17:
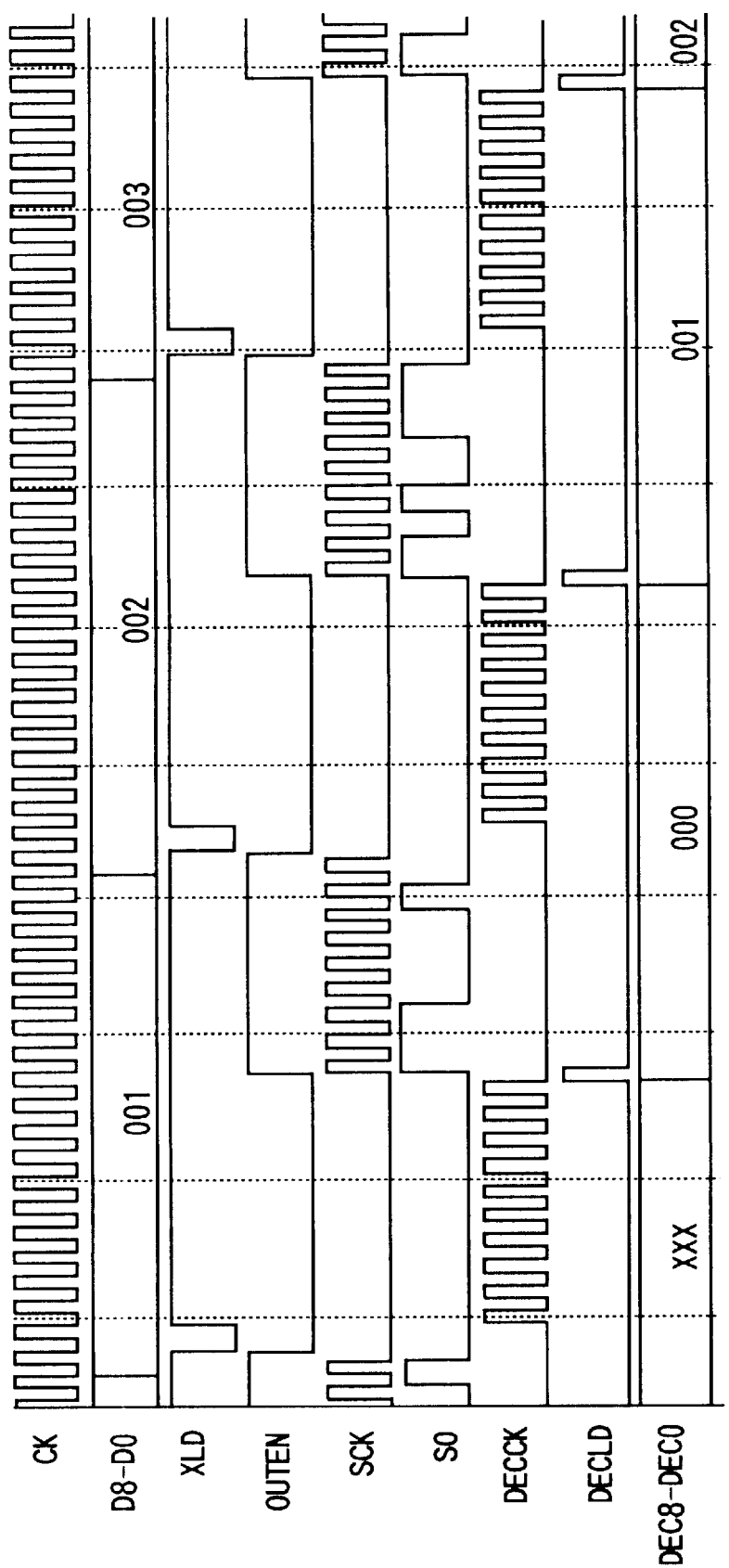
FIG. 17 is a schematic timing chart of an operation of the P/S conversion circuit in FIG. 15 and the S/P conversion circuit in FIG. 16.

FIG. 17 is a timing chart of operations of the P/S conversion circuit 111 in FIG. 15 and the S/P conversion circuit 181 in FIG. 16.

As explained above, shift registers in the P/S conversion circuit 111 and S/P conversion circuit 181 are added an XOR circuit, selectors, etc. and composing a linear feedback shift register (LFSR) so that it is possible to encode and decode by using the LFSR. The LFCR in the S/P conversion circuit 181 and the LFSR in the P/S conversion circuit operates inverse calculation to each other.

In the P/S conversion circuit 111, shift registers 720 to 728 are made to have the LFSR configuration before P/S conversion, encodes the data by operating exactly for N clock times (for example N=10), then performs P/S conversion and transmits the serial data SO.

In the S/P conversion circuit 181, after receiving all the serial data, the shift registers 820 to 828 for S/P conversion are switched to the LFSR, wherein inverse calculation of the P/S conversion side is operated, the LFSR is operated exactly for the above N clock times for decoding, and the data is recovered.

Note that encoding tolerance can be improved by providing a plurality of LFSR configurations and switching them and switching the above N.

The P/S conversion, S/P conversion and an operation frequency of a data transfer are set low due to characteristics of a serial transfer path, etc. in some cases, but it is sufficient to circulate the data by operating the shift registers (shifters) and feedback gates in the above LFSR operation, so a high speed operation is possible. By being configured to use a plurality of clock signals and operating the LFSR by a clock signal of a higher frequency than that during transmitting operation of the serial data and/or receiving operation of the serial data, it is possible to improve the calculation speed of encoding and decoding.

By being configured as shown in FIGS. 1, 2, 5 and 6, simultaneous processing in parallel is possible when there are a plurality of data transfer requests. Also, from the transfer request till transfer end can be made short and estimation of the waiting time becomes easy.

By being configured as shown in FIGS. 1, 2, 5, 11, 12, 13, etc., the number of signal lines and a signal amplitude can be made smaller comparing with those in bus wiring in the related art, and electromagnetic interferences (EMI) can be reduced. Also, when a distance between peripheral circuits is long, the data transfer rate can be improved by making characteristic impedance constant for terminating.

By being configured as shown in FIGS. 1, 2 and 5, a wiring area can be reduced comparing with that in the bus wiring in the related art. Also, by installing a serial interface circuit in a peripheral circuit, it is possible to reduce the number of pins of an IC chip and connector. Also, a portion wherein problems arise at the time of a test and transfer error occurrence can be easily detached in terms of topology.

By being configured as shown in FIGS. 1, 2, 5, 12, 13, etc., the number of connections of the peripheral circuits can be increased without declining the transfer rate.

By being configured as shown in FIGS. 8, 9, 10, etc., efficiency of serial transfer can be improved.

By being configured as shown in FIGS. 14, 15, 16 and 17, etc., the security of transferring data which should be protected by a copyright can be improved.

By being configured as shown in FIGS. 1, 2, 8, 9, 10, etc., power consumption can be reduced.

By being configured as shown in FIGS. 1, 2, 11, etc., the number of components and IC chips can be reduced.

By being configured as shown in FIGS. 1, 2, 5, 11, etc., an installing form of a serial transfer path can be optimized for a peripheral circuit requesting a high transfer rate and a peripheral circuit not requesting a high transfer rate. For example, a serial data transfer rate, the number of serial transfer paths, existence of a differential input, existence of termination, selection of the wiring form, etc. can be optimized.

Note that the above embodiments are described as examples and the present invention is not limited to the above embodiments.

What is claimed is:

1. A bus emulation comprising:
    a hub circuit;
    a plurality of serial interface circuits; and serial transfer paths for connecting said plurality of serial interface circuits and said hub circuit and being installed on a large scale integrated circuit or a print circuit board,
    said serial interface circuit comprising:
        a parallel to serial conversion circuit for converting parallel data from a peripheral circuit connected to the serial interface circuit to a serial data and supplying to said serial transfer path; and a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein said hub circuit divides said plurality of serial interface circuit into a plurality of groups for performing data transfers in advance and relays the serial data between said serial interface circuits so that parallel data is transferred in said respective plurality of groups.

2. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:

a parallel to serial conversion circuit for converting parallel data from a peripheral circuit connected to the serial interface circuit to a serial data and supplying to said serial transfer path; and a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein:

the serial data supplied from said serial interface circuit to said hub circuit via said serial transfer path comprises an address information indicating a transfer destination;

said hub circuit supplies said serial data to said serial interface circuit connected to a peripheral circuit as said transfer destination based on said address information; and said hub circuit comprises a buffer for storing serial data supplied from said serial interface circuit via said serial transfer path;

an extraction circuit for extracting address information included in the serial data;

a control circuit for determining transfer priority when a plurality of transfer requests exist to a same transfer destination; and a selection circuit for selecting a transfer path of said serial data based on the address information extracted by said extraction circuit and the priority determined by said control circuit.

3. A bus emulation apparatus as set forth in claim 2, wherein:

said hub circuit further comprises a detection circuit for detecting transfer end of the serial data form said serial interface circuit and/or an interrupt by said serial interface circuit; and said control circuit determines said priority based on a detection result of said detection circuit.

4. A bus emulation apparatus as set forth in claim 2, wherein:

said hub circuit further comprises a clock signal generation circuit for generating a plurality of clock signals having different clock frequencies; and said buffer receives a clock signal from said clock signal generation circuit in accordance with a transfer rate of a peripheral circuit as a transfer source or a transfer destination and inputs/outputs said serial data at a transfer rate in accordance with the supplied clock signal.

5. A bus emulation apparatus as set forth in claim 2, wherein:

said serial interface circuit comprises a counter for counting the number of data in said buffer in said hub circuit; stops the transmitting said serial data to said hub circuit when a counter value of said counter indicates that said buffer has no vacancy, and transmits said serial data to said hub circuit when the count value of said counter indicates that said buffer has a vacancy.

6. A bus emulation apparatus as set forth in claim 2, wherein said serial interface circuit, when the parallel data of this time supplied from said peripheral circuit is exactly identical or substantially identical with the preceding parallel data, generates a flag indicating the exactly identity or substantially identity and supplies the generated flag to said hub circuit; and said hub circuit comprises a cache memory for storing preceding serial data corresponding to said preceding parallel data and generates serial data of this time corresponding to said parallel data of this time based on the serial data stored in said cache memory and said flag.

7. A bus emulation apparatus as set forth in claim 6, wherein said serial interface circuit detects that a difference between the preceding parallel data and the parallel data of this time is ±1 and generates said flag indicating the difference; and said hub circuit operates calculation of ±1 on the preceding serial data stored in said cache memory based on said flag to generate said serial data of this time.

8. A bus emulation apparatus as set forth in claim 2, wherein said hub circuit, when the serial data of this time supplied from the serial interface circuit via a serial transfer path is exactly identical or substantially identical with the preceding serial data, generates a flag indicating the exactly identity or substantially identity; and said serial interface circuit connected to a peripheral circuit as a transfer destination comprises a cache memory for storing the preceding parallel data corresponding to the preceding serial data from said hub circuit and generates parallel data of this time based on the parallel data stored in said cache memory and said flag from said hub circuit.

9. A bus emulation apparatus as set forth in claim 8, wherein said hub circuit detects that a difference between the preceding serial data and the serial data of this time is ±1 and generates said flag indicating the difference; and said serial interface circuit connected to a peripheral circuit as said transfer destination operates a calculation of ±1 based on said flag on the preceding parallel data stored in said cache memory and generates said parallel data of this time.

10. A bus emulation apparatus as set forth in claim 2, wherein:

said serial interface circuit connected to a peripheral circuit as a transfer destination, when the parallel data of this time supplied from said peripheral circuit is exactly identical or substantially identical with the preceding parallel data, generates a flag indicating the exactly identity or substantially identity and supplies the generated flag to said hub circuit; and said serial interface circuit connected to a peripheral circuit of said transfer destination comprises a cache memory for storing the preceding parallel data corresponding to the preceding serial data from said hub circuit and generates the parallel data of this time based on the parallel data stored in said cache memory and said flag from said hub circuit.

11. A bus emulation apparatus as set forth in claim 10, wherein:

said serial interface circuit connected to the peripheral circuit of said transfer destination detects that difference between the preceding parallel data and the parallel data of this time is ±1 and generates said flag indicating the difference; and said serial interface circuit connected to the peripheral circuit as said transfer destination operates a calculation of ±1 on the preceding parallel data stored in said cache memory based on said flag to generate said parallel data of this time.

12. A bus emulation apparatus as set forth in claim 2, wherein said hub circuit monitors working states of said buffer.

13. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:
 a parallel to serial conversion circuit for converting parallel data from a peripheral circuit connected to the serial interface circuit to a serial data and supplying to said serial transfer path; and
 a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein:

the serial data supplied from said serial interface circuit to said hub circuit via said serial transfer path comprises an address information indicating a transfer destination; and said hub circuit supplies said serial data to said serial interface circuit connected to a peripheral circuit as said transfer destination based on said address information, wherein a data length of an address information on a most frequently transferred peripheral circuit is shorter than a data length of address information on a least frequently transferred peripheral circuit.

14. A bus emulation apparatus as set forth in claim 1 comprising:

a hub circuit;

a plurality of serial interface circuits; and serial transfer paths for connecting said plurality of serial interface circuits and said hub circuit and being installed on a large scale integrated circuit or a print circuit board.

said serial interface circuit comprising:
 a parallel to serial conversion circuit for converting parallel data from a peripheral circuit connected to the serial interface circuit to a serial data and supplying to said serial transfer path; and
 a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein:

said hub circuit supplies serial data at a plurality of transfer rates to said serial interface circuits and conducts tests of transfer rates; and said serial interface circuit converts the parallel data generated in said serial to parallel conversion circuit to serial data in said parallel to serial conversion circuit and sends back to said hub circuit during said transfer rates tests.

15. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:
 a parallel to serial conversion circuit for converting parallel data from a peripheral circuit connected to the serial interface circuit to a serial data and supplying to said serial transfer path; and
 a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein said hub circuit supplies serial data from a specific serial interface circuit among said plurality of serial interface circuits to a serial interface circuit connected to a different peripheral circuit from a peripheral circuit as a transfer destination indicated by address information in the serial data.

16. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:
 a parallel to serial conversion circuit for converting parallel data from a peripheral circuit connected to the serial interface circuit to a serial data and supplying to said serial transfer path; and
 a serial to parallel conversion circuit for convertmnn serial data supplied from said hub circuit via said serial transfer path to a parallel data and supplying to said peripheral circuit and said hub circuit supplying the serial data supplied from said serial interface circuit via said serial transfer path to a serial interface circuit connected to a peripheral circuit as a transfer destination of said parallel data amona said plurality of serial interface circuits via said serial transfer path, wherein:

said parallel to serial conversion circuit converts the parallel data from said peripheral circuit to encoded serial data and supplies to said hub circuit:

said serial to parallel conversion circuit converts the encoded serial data from said hub circuit to decoded parallel data, said parallel to serial conversion circuit comprises a first linear feedback shift register for encoding parallel data from said peripheral circuit;

said serial to parallel conversion circuit comprises a second linear feedback shift register for decoding encoded serial data from said hub circuit; and said first and second linear feedback shift registers mutually operate an inverse calculation.

17. A bus emulation apparatus as set forth in claim 16, wherein an operation frequency of said first linear feedback shift register during an encoding operation is higher than an operation frequency during a transmission operation for shifting and transmitting the encoded serial data.

18. A bus emulation apparatus as set forth in claim 16, wherein an operation frequency of said second linear feedback shift register during a decoding operation is higher than an operation frequency during a receiving operation for shifting and receiving the encoded serial data from said hub circuit.

19. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:
  a parallel to serial conversion circuit for converting parallel data from a peripheral circuit connected to the serial interface circuit to a serial data and supplying to said serial transfer path; and
  a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein:

said parallel to serial conversion circuit converts the parallel data from said peripheral circuit to encoded serial data and supplies to said hub circuit; and said serial to parallel conversion circuit converts the encoded serial data from said hub circuit to decoded parallel data, and wherein said serial interface circuit further comprises a register for storing identification information or encoding key information and supplies backup power to the register during a power source failure.

20. A bus emulation apparatus as set forth in claim 1 comprising:

a hub circuit;

a plurality of serial interface circuits: and serial transfer paths for connecting said plurality of serial interface circuits and said hub circuit and being installed on a large scale integrated circuit or a print circuit board, said serial interface circuit comprising:
  a parallel to serial conversion circuit for converting parallel data from a peripheral circuit connected to the serial interface circuit to a serial data and supplying to said serial transfer path: and
  a serial to parallel conversion circuit for converting serial data supplied from said hub circuit via said serial transfer path to a parallel data and supplying to said peripheral circuit: and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein a signal line of said serial transfer path is terminated by a terminal resistance, and said terminal resistance comprises a plurality of transistors connected in parallel, said plurality of transistors are selectively set to be an on state and the terminal resistance value is set.

21. A bus emulation apparatus comprising:

a hub circuit;

a plurality of serial interface circuits; and serial transfer paths for connecting said plurality of serial interface circuits and said hub circuit and being installed on a large scale integrated circuit or a print circuit board, said serial interface circuit comprising:
  a parallel to serial conversion circuit for converting parallel data from a peripheral circuit connected to the serial interface circuit to a serial data and supplying to said serial transfer path; and
  a serial to parallel conversion circuit for converting serial data supplied from said hub circuit via said serial transfer path to a parallel data and supplying to said peripheral circuit; and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein:

said hub circuit and said serial interface circuit further comprises:
  a driver for transmitting serial data to said serial transfer path; and
  a receiver for receiving serial data from said serial transfer path; and
  the wire for shielding a signal line of said serial transfer path and a supply line of a drive voltage of said driver and receiver are connected.

22. A bus emulation apparatus as set forth in claim 21 wherein:

said receiver comprises a differential type amplification circuit for outputting serial data;

one input terminal of said differential amplify circuit is connected to a signal line of said serial transfer path; and other input terminal of said differential type amplification circuit is supplied as an input threshold a voltage obtained by dividing said drive voltage.

23. A bus emulation apparatus a; set forth in claim 1 comprising:
   a hub circuit;
   a plurality of serial interface circuits; and serial transfer paths for connecting said plurality of serial interface circuits and said hub circuit and being installed on a large scale integrated circuit or a print circuit board,
said serial interface circuit comprising:
   a parallel to serial conversion circuit for converting parallel data from a peripheral circuit connected to the serial interface circuit to a serial data and supplying to said serial transfer path: and
   a serial to parallel conversion circuit for converting serial data supplied from said hub circuit via said serial transfer path to a parallel data and supplying to said peripheral circuit: and said hub circuit supplying the serial data supplied from said serial interface circuit via said serial transfer path to a serial interface circuit connected to a peripheral circuit as a transfer destination of said parallel data among said plurality of serial interface circuits via said serial transfer path, wherein the signal line of said serial transfer path is grounded via capacitors and terminal resistance element connected in series.

24. A bus emulation apparatus as set forth in claim 23, wherein the wire for shielding the signal line of said serial transfer path and a ground terminal of said terminal resistance element are connected.

* * * * *